(12) United States Patent
Du et al.

(10) Patent No.: US 11,269,121 B2
(45) Date of Patent: Mar. 8, 2022

(54) OPTICAL CAMOUFLAGE FILTERS

(71) Applicant: 3M INNOVATIVE PROPERTIES COMPANY, St. Paul, MN (US)

(72) Inventors: Guanglei Du, Woodbury, MN (US); John A. Wheatley, Lake Elmo, MN (US); Yi Hang Lv, Shanghai (CN); Anthony M. Renstrom, Forest Lake, MN (US); Neeraj Sharma, Woodbury, MN (US); Fuguo Xu, Shanghai (CN)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 480 days.

(21) Appl. No.: 16/071,544

(22) PCT Filed: May 6, 2016

(86) PCT No.: PCT/CN2016/081271
§ 371 (c)(1),
(2) Date: Jul. 20, 2018

(87) PCT Pub. No.: WO2017/124664
PCT Pub. Date: Jul. 27, 2017

(65) Prior Publication Data
US 2019/0025481 A1 Jan. 24, 2019

Related U.S. Application Data

(60) Provisional application No. 62/281,643, filed on Jan. 21, 2016.

(51) Int. Cl.
*G02B 5/26* (2006.01)
*G02B 5/22* (2006.01)
(Continued)

(52) U.S. Cl.
CPC ............... *G02B 5/26* (2013.01); *G02B 5/206* (2013.01); *G02B 5/208* (2013.01); *G02B 5/22* (2013.01); *G02B 5/223* (2013.01); *G02B 5/281* (2013.01)

(58) Field of Classification Search
CPC . G02B 5/26; G02B 5/22; G02B 5/208; G02B 5/223; G02B 5/281; G02B 5/204; G02F 1/21; G02F 2203/055
See application file for complete search history.

(56) References Cited

U.S. PATENT DOCUMENTS

| | | |
|---|---|---|
| 5,183,602 A | 2/1993 | Raj |
| 5,233,436 A | 8/1993 | Oksman |

(Continued)

FOREIGN PATENT DOCUMENTS

| | | |
|---|---|---|
| CN | 103261927 | 8/2013 |
| CN | 203733133 | 7/2014 |

(Continued)

OTHER PUBLICATIONS

Machine translation of JP-2010072616-A. (Year: 2010).*

(Continued)

*Primary Examiner* — Kimberly N. Kakalec
(74) *Attorney, Agent, or Firm* — Clifton F. Richardson

(57) ABSTRACT

A system may include one or both of a light emitter (46) and a light receiver (40), and an optical filter (10). The optical filter (10) includes a wavelength selective scattering layer (14). The wavelength selective scattering layer (14) may have a near-infrared scattering ratio of less than about 0.9. The filter (10) may have a visible reflective haze ratio of greater than about 0.5. A method may include disposing the wavelength selective scattering layer (14) adjacent one or both of the light emitter (46) and the light receiver (40). The optical filter (10) may include a wavelength selective reflec- (Continued)

tive layer (16). The optical filter (10) may include a wavelength selective absorbing layer (34). An article may include the optical filter (10). The wavelength selective scattering layer (14) may have an average near-infrared scattering of less than 60%, an average visible scattering of greater than 10%, and a difference between the % total visible reflectance and the % diffuse visible reflectance of less than 20.

33 Claims, 21 Drawing Sheets

(51) Int. Cl.
*G02B 5/20* (2006.01)
*G02B 5/28* (2006.01)

(56) References Cited

U.S. PATENT DOCUMENTS

| | | | |
|---|---|---|---|
| 5,956,122 | A | 9/1999 | Doster |
| 2008/0316594 | A1 | 12/2008 | Hashiguchi et al. |
| 2012/0038990 | A1 | 2/2012 | Hao |
| 2015/0192717 | A1* | 7/2015 | Katagiri ............... G01J 1/0474 359/359 |

FOREIGN PATENT DOCUMENTS

| | | | |
|---|---|---|---|
| CN | 204129751 | | 1/2015 |
| CN | 104573667 | | 4/2015 |
| CN | 204442500 | | 7/2015 |
| JP | H04-43303 | | 2/1992 |
| JP | 2002-359491 | | 12/2002 |
| JP | 2003-17716 | | 1/2003 |
| JP | 2004125822 | | 4/2004 |
| JP | JP 2005-288876 | | 10/2005 |
| JP | 2008083647 | | 4/2008 |
| JP | 2009-40144 | | 2/2009 |
| JP | 2010072616 A * | | 4/2010 |
| JP | 2012-89593 | | 5/2012 |
| JP | 2013065052 | | 4/2013 |
| JP | 2015-501853 | | 1/2015 |
| JP | 2015110691 | | 6/2015 |
| WO | WO-2014050806 A1 * | 4/2014 | ........... G02B 5/0825 |
| WO | WO 2014/170323 | | 10/2014 |
| WO | WO 2014-178276 | | 11/2014 |
| WO | WO 2015-155357 | | 10/2015 |
| WO | WO 2017-127483 | | 7/2017 |

OTHER PUBLICATIONS

International Search Report for PCT International Application No. PCT/CN2016/081271, dated Oct. 31, 2016, 5 pages.
https://www.tokaioptical.com/product/tokai_color_white_ir_window.pdf, Be Artistic, Color and White IR Transmission Film.

* cited by examiner

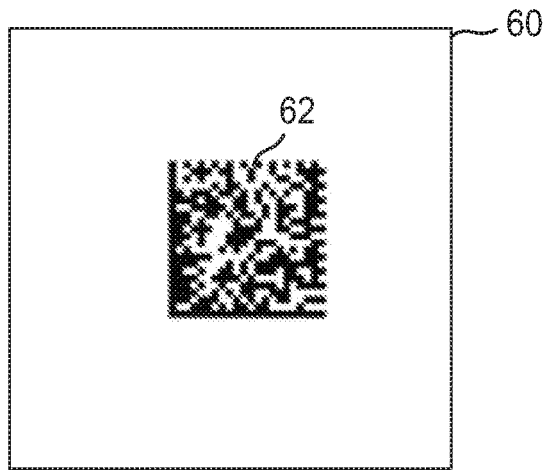
FIG. 3A
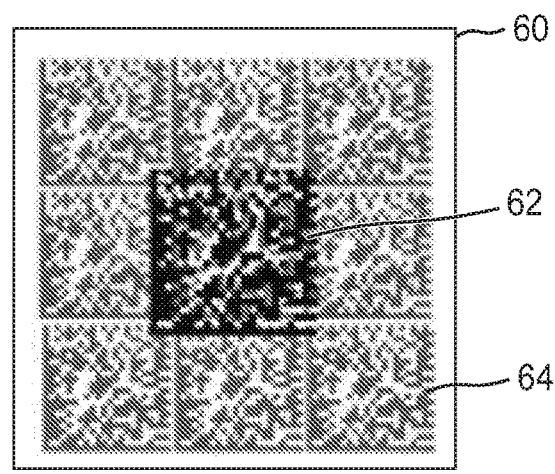
FIG. 3B
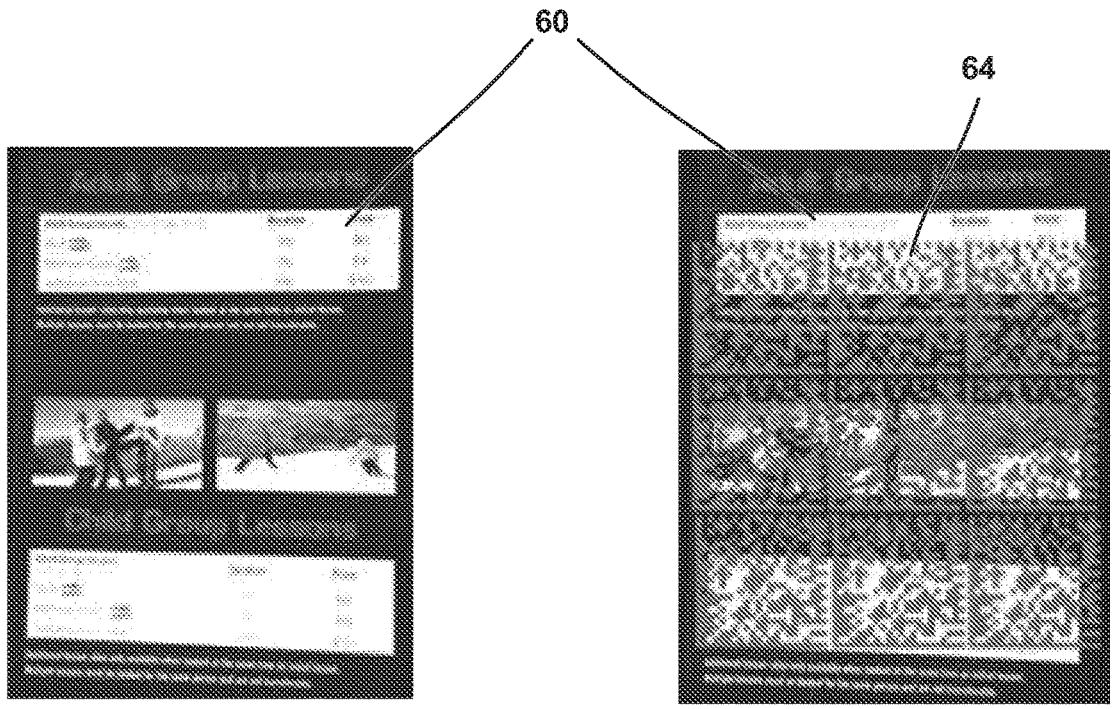
FIG. 3C
FIG. 3D

OPTICAL CAMOUFLAGE FILTERS

BACKGROUND

Light may reflect from surfaces in different ways, for example, as a specular reflection or as a diffusive reflection. In opaque materials, specular reflection may occur on an uppermost surface layer of the material, for example, at an air/material interface, and the reflection may carry a full spectrum of incident light. Specular reflection may manifest as shininess or gloss, which may account for less than 4% of the total reflected light. In contrast, diffusive reflection may occur under a top surface of the material, and may carry selected wavelengths or color. For example, color may be seen in the diffuse reflection of a non-metallic object. Both kinds of reflection may be observed, for example, at hybrid surfaces such as surfaces including a paint coat covered by a clear top coat. Thus, specular reflection may occur at the air/top coat interface, while diffuse reflection may occur at the top coat/paint coat interface.

Optical filters are employed in a wide variety of applications such as optical communication systems, sensors, imaging, scientific and industrial optical equipment, and display systems. Optical filters may include optical layers that manage the transmission of incident electromagnetic radiation, including light. Optical filters may reflect or absorb a portion of incident light, and transmit another portion of incident light. Optical layers within an optical filter may differ in wavelength selectivity, optical transmittance, optical clarity, optical haze, and index of refraction.

SUMMARY

In an example, the disclosure describes an example system that may include one or both of a light emitter or a light receiver. The system may include an optical filter adjacent one or both of the light emitter or the light receiver. The optical filter includes a wavelength selective scattering layer. The wavelength selective scattering layer may have a near-infrared scattering ratio of less than about 0.9. The near-infrared scattering ratio is a ratio of an average near-infrared scattering to an average visible scattering. The wavelength selective scattering layer may have a visible reflective haze ratio of greater than about 0.5. The visible reflective haze ratio is a ratio of an average visible diffusive reflectance to an average visible total reflectance.

In an example, the disclosure describes an example technique that includes disposing an optical filter adjacent one or both of a light emitter or a light receiver. The optical filter includes a wavelength selective scattering layer. The wavelength selective scattering layer may have a near-infrared scattering ratio of less than about 0.9. The wavelength selective scattering layer may have a visible reflective haze ratio of greater than about 0.5.

In an example, the disclosure describes an example article including an optical filter. The optical filter includes a wavelength selective scattering layer. The wavelength selective scattering layer may have a near-infrared scattering ratio of less than about 0.9. The wavelength selective scattering layer may have a visible reflective haze ratio of greater than about 0.5.

In an example, the disclosure describes an example article including an optical filter. The optical filter includes a wavelength selective scattering layer. The wavelength selective scattering layer may have an average near-infrared scattering of less than 60%, an average visible scattering of greater than 10%, and a difference between the % total visible reflectance and the % diffuse visible reflectance of less than 20.

In an example, the disclosure describes an example system that may include one or both of a light emitter or a light receiver. The example system may include an optical filter adjacent one or both of the light emitter or the light receiver. The optical filter may include a wavelength selective scattering layer configured to substantially scatter visible wavelengths. The optical filter may include a wavelength selective reflective layer and at least one wavelength selective absorbing layer. Each respective wavelength selective layer may be configured to transmit near-infrared wavelengths.

In an example, the disclosure describes an example article that may include an optical filter adjacent one or both of the light emitter or the light receiver. The optical filter may include a wavelength selective scattering layer configured to substantially scatter visible wavelengths. The optical filter may include a wavelength selective reflective layer and at least one wavelength selective absorbing layer. Each respective wavelength selective layer may be configured to transmit near-infrared wavelengths.

In an example, the disclosure describes an example system that may include one or both of a light emitter or a light receiver. The example system may include an optical filter adjacent one or both of the light emitter or the light receiver. The optical filter may include a wavelength selective reflective layer and at least one wavelength selective absorbing layer. Each respective wavelength selective layer may be configured to transmit near-infrared wavelengths. The optical filter may have a visible transmittance at 380-800 nm of less than 0.1% and a near-infrared transmittance at 830-900 nm of greater than 50%.

In an example, the disclosure describes an example article that may include an optical filter adjacent one or both of the light emitter or the light receiver. The optical filter may include a wavelength selective reflective layer and at least one wavelength selective absorbing layer. Each respective wavelength selective layer may be configured to transmit near-infrared wavelengths. The optical filter may have a visible transmittance at 380-800 nm of less than 0.1% and a near-infrared transmittance at 830-900 nm of greater than 50%.

The details of one or more aspects of the invention are set forth in the accompanying drawings and the description below. Other features, objects, and advantages of the invention will be apparent from the description and drawings, and from the claims.

BRIEF DESCRIPTION OF DRAWINGS

The foregoing and other aspects of this invention are made more evident in the following Detailed Description, when read in conjunction with the attached Figures.

FIGS. 3A-3D are conceptual diagrams of an example system including an example optical filter and an electronic display displaying a visibly perceptible pattern and an invisible near-infrared pattern.

Figure 1A:
FIGS. 1A-1K are lateral cross-sectional views of example articles including optical filters.

It should be understood that features of certain Figures of this disclosure may not necessarily be drawn to scale, and that the Figures present non-exclusive examples of the techniques disclosed herein.

DETAILED DESCRIPTION

In this disclosure, "visible" refers to wavelengths in a range between about 400 nm and about 700 nm, and "near-infrared" refers to wavelengths in a range between about 700 nm and about 2000 nm, for example, wavelengths in a range between about 800 nm and about 1200 nm. ULI (ultra-low index) films refers to optical films including a binder, a plurality of particles, and a plurality of interconnected voids, as described in U.S. Patent Application Publication No. 2012/0038990, incorporated herein in its entirety by reference.

Ambient sources of electromagnetic radiation may interfere with receivers configured to receive light of particular wavelengths or from particular sources, or with light emitters configured to emit light of particular wavelengths. For example, visible wavelengths may interfere with receiving, sensing, or transmitting near-infrared wavelengths, for example, by increasing noise in a light receiver or in a light emitter. Sources of electromagnetic radiation may also be unintentionally revealed. For example, while light emitted by a light emitter configured to emit only near-infrared wavelengths may not be visibly perceptible, the device or the structure responsible for emitting the light, for example, a housing of the light emitter, may be visibly perceptible. Masking, concealing or otherwise camouflaging the light emitter may present challenges because the camouflage techniques may undesirably result in blocking, interference, or reduction in the transmission of desired near-infrared wavelengths. Optical filters according to examples of this disclosure may be used to prevent unwanted optical interference from visible wavelengths, or to camouflage sources of electromagnetic radiation from visible perception, while at least partially allowing desired near-infrared wavelengths to be transmitted by a light emitter or received by a light receiver, or while allowing transmission of near-infrared wavelengths with relatively high clarity.

For example, a light receiver operating to receive or sense near-infrared wavelengths may be shielded from visible wavelengths, preventing interference with the receiving or sensing of near-infrared wavelengths that may be caused by visible wavelengths. A light transmitter operating to transmit near-infrared wavelengths may be camouflaged against visible perception by scattering visible wavelengths. For example, the scattered visible wavelengths may conceal the presence of the light transmitter, without obstructing the transmission of near-infrared wavelengths.

The amount of specular reflection off a surface may be determined by Fresnel reflection of air interface. For an opaque surface with a clear top layer, it may be assumed that all specular reflection arises from the top air interface, and that the rest of the reflection is diffusive reflection from a bottom layer. An opaque colored material could also follow similar model, while using its refractive index to calculate Fresnel reflection on top surface and treat all other reflection is diffusive. The example optical filters may have a diffusive coating disposed on a clear substrate or a reflective film. When the diffusive coating is coated on clear substrate, it may have a higher haze to hide the items underneath. When the coating is coated on a reflector, the coating will diffuse incident light twice, by reflection. In that case, the coating may have less haze.

Thus example systems may include one or both of a light receiver and a light emitter, and an optical filter that includes a wavelength selective scattering layer that may at least partially reduce the transmission of visible wavelengths, while at least partially allowing the transmission of near-infrared wavelengths. For example, the wavelength selective scattering layer may scatter a majority of incident visible light. Example systems and articles according to the present disclosure may include example optical articles including example wavelength selective scattering layers that transmit near-infrared light with relatively high clarity while reducing the transmission of visible wavelengths, for example, by selectively scattering or reflecting visible wavelengths.

FIGS. 1A-1K are lateral cross-sectional views of example articles including optical filters. FIG. 1A shows a lateral cross-sectional view of example article 10a. Article 10a includes a substrate 12 and a wavelength selective scattering layer 14. The substrate 12 may include glass, polymer, metal, or any other suitable rigid, semi-rigid, or soft materials, and combinations thereof. While the substrate 12 is shown as a layer in the example article 10a of FIG. 1A, in examples, substrate 12 may assume any suitable three dimensional shape that may have a flat, a substantially flat, or a textured surface. In examples, substrate 12 may include a housing, a screen, a part, or a surface of a device, for example, of an electronic device such as a personal computing or communication device, for example, a cellphone or a smartwatch.

The wavelength selective scattering layer 14 selective scatters visible light and transmits near-infrared light. In examples, the wavelength selective scattering layer may have a near-infrared scattering ratio of less than about 0.9, less than about 0.8, less than about 0.7, less than about 0.6, or less than about 0.5. The near-infrared scattering ratio is a ratio of an average near-infrared scattering to an average visible scattering. For example, the average scattering in a selected narrow or broad near-infrared wavelength band (for example, of bandwidth 1300 nm, 500 nm, 100 nm, 10 nm, 1 nm) may be determined, and the average scattering in a selected narrow or broad visible wavelength band may be determined, and a ratio of the respective averages may be determined. In examples, the wavelength selective scattering layer 14 may have a visible reflective haze ratio of greater than about 0.5, or greater than about 0.7, or greater than about 0.9. The visible reflective haze ratio is a ratio of an average visible diffusive reflectance to an average visible total reflectance. In examples, the wavelength selective scattering layer 14 may transmit less than about 50% of incident visible light. In examples, the wavelength selective scattering layer 14 may transmit greater than about 50% of incident near-infrared light. In examples, the wavelength selective scattering layer 14 may transmit less than about 50% of incident visible light, and transmit greater than about 50% of incident near-infrared light. In examples, the wavelength selective scattering layer 14 may scatter greater than about 50% of incident visible light. For example, the wavelength selective scattering layer 14 may transmit less than about 50% of incident visible light by scattering more than about 50% of incident visible light. In examples, the wavelength selective layer 14 may scatter greater than about 50% of incident visible light as white light.

The wavelength selective scattering layer 14 may include a medium and a plurality of particles with respective predetermined refractive indices. In examples, the wavelength selective scattering layer 14 may include a beaded diffuser layer. For example, the wavelength selective scattering layer 14 may include a medium and beads dispersed in the medium. The medium of the beaded diffuser layer may include glass, polymer, or any other suitable optical medium, or combinations thereof. The beads may include silica, glass, polymeric, organic, inorganic, metal oxide, polystyrene, or other suitable scattering materials, or combinations thereof. The diffuser layer may include pores including a gas such as air. In examples, the pores including gas may be encapsulated in beads.

The wavelength selective scattering layer 14 may include an optical medium have a first refractive index. The optical medium may include a plurality of particles. The plurality of particles may have a second refractive index such that an absolute difference between the first refractive index and the second refractive index is less than about 0.1. In examples, the plurality of particles may have an average particle size of less than about 5 μm, and the absolute difference between the first and second refractive indices may be less than about 0.1. In examples, the plurality of particles may have an average particle size of less than about 1 μm, and the absolute difference between the first and second refractive indices may be less than about 0.2. In examples, the plurality of particles may have an average particle size of less than about 0.5 μm, and the absolute difference between the first and second refractive indices may be less than about 0.4. In examples, the plurality of particles may have an average particle size of less than about 0.3 μm, and the absolute difference between the first and second refractive indices may be less than about 0.6. In examples, the plurality of particles may have an average particle size of less than about 0.2 μm, and the absolute difference between the first and second refractive indices may be less than about 1.8.

In examples, an average particle size of the plurality of particles, the first refractive index, and the second refractive index are selected from a region under line 82 of FIG. 15, described below. Thus, the near-infrared scattering ratio of the wavelength selective scattering layer 14 may be less than 0.2. In examples, an average particle size of the plurality of particles, the first refractive index, and the second refractive index are selected from a region under line 84 of FIG. 15. Thus, the near-infrared scattering ratio of the wavelength selective scattering layer 14 may be less than 0.4. In examples, an average particle size of the plurality of particles, the first refractive index, and the second refractive index are selected from a region under line 86 of FIG. 15. Thus, the near-infrared scattering ratio of the wavelength selective scattering layer 14 may be less than 0.6. In examples, an average particle size of the plurality of particles, the first refractive index, and the second refractive index are selected from a region under line 88 of FIG. 15. Thus, the near-infrared scattering ratio of the wavelength selective scattering layer 14 may be less than 0.8. In examples, the near-infrared scattering ratio of the wavelength selective scattering layer 14 may be less than 0.7, or may be less than 0.5. In examples, the region under respective lines 82, 84, 86, 88 or any other region may be bounded by a lower particle size bound. For example, the region may only include particle sizes above 10 nm, or 30 nm, or 50 nm, or particle sizes greater than particle sizes at which Rayleigh scattering may manifest or predominate.

In examples, the wavelength selective scattering layer 14 may have a total visible reflectance of less than 50%, of at least 50%, or at least 60%, or at least 70%. In examples, the total visible reflectance may be less than 50%, and the wavelength selective scattering layer 14 may conceal objects by visible haze. In examples, the total visible reflectance may be greater than 50%, and the wavelength selective scattering layer 14 may conceal objects by a combination of visible reflection and visible haze. In examples, the wavelength selective scattering layer 14 may have an average near-infrared scattering of less than 60%, or less than 40%. In examples, the wavelength selective scattering layer may have an average visible scattering of greater than 10%, or greater than 25%, or greater than 58%. In examples, a difference between the % total visible reflectance and the % diffuse visible reflectance of the wavelength selective scattering layer 14 may be less than 20. In examples, the wavelength selective scattering layer may have an average near-infrared scattering of less than 40%, and an average visible scattering of greater than 58%, and the difference between the % total visible reflectance and the % diffuse visible reflectance may be less than 18.

In examples, the wavelength selective scattering layer 14 may have a visible haze of at least 15%, or at least 25%, or at least 35%, or at least 50%. In examples, the optical filter 10a may include surface optical microstructures, such as microreplicated surface structures.

In examples, the wavelength selective scattering layer 14 may include ULI layer including a binder, a plurality of particles, and a plurality of interconnected voids. A volume fraction of the plurality of interconnected voids in the optical filter may not less than about 20%. A weight ratio of the binder to the plurality of the particles may not be less than about 1:2.

Figure 1B:

FIG. 1B shows a lateral cross-sectional view of example article 10b. Article 10b may include the substrate 12, the wavelength selective scattering layer 14, and a reflective layer 16. While reflective layer 16 is shown between the wavelength selective scattering layer 14 and the substrate 12 in article 10b, in examples, article 10b may not include the substrate 12, and the wavelength selective scattering layer may be disposed on the reflective layer 16. In examples, substrate 12 may include the reflective layer 16, for example, at a major surface or within an interior of substrate 12. In examples, the reflective layer 16 may be disposed below the substrate 12. In examples, the reflective layer 16 may be disposed above the substrate 12. In examples, the reflective layer 16 may be perforated. In examples, article 10b may reflect less than 50% of visible light, and transmit more than 50% of near-infrared light. In examples, reflective layer 16 may be wavelength selective, for example, reflecting only selected wavelengths. Reflective layer 16 may include a multilayer optical film, a dichroic reflector, an interference film, an inorganic multilayer stack, a metal dielectric stack, a polished substrate, a mirror, a reflective polarizer, or a reflective surface such as a reflective metal or glass surface. In examples, article 10b may include a dye layer (not shown) between the reflective layer and the wavelength selective scattering layer 14, or above the wavelength selective scattering layer 14, or positioned adjacent any layer in article 10b. The dye layer may include a spectrally selective dye that may be transmissive or clear in near-infrared, and neutral in visible, such that it reduces the visible reflection of the reflective layer 16. In examples, the dye layer may have at least 30%, 50%, 70%, or 90% absorption. In examples, the dye layer could be colored, so that it has a visible color, while remaining transmissive in near-infrared.

Figure 1C:

FIG. 1C shows a lateral cross-sectional view of example article 10c. Article 10c may include the substrate 12 and the wavelength selective scattering layer 14. Article 10c may optionally include one or more of the reflective layer 16, an ink receptive layer 18, a printed pattern layer 22, and a protective layer 24, as shown in FIG. 1C. While FIG. 1C shows a particular arrangement for layers in article 10c, the respective layers may be rearranged in any suitable configuration. For example, substrate 12 may be omitted when the reflective layer 16 is present. The protective layer 24 may include a sealant layer. In examples, the inked pattern layer 22 includes a printed pattern of ink or pigment that may be deposited on the ink receptive layer 18. In examples, the ink receptive layer may be omitted, and the inked pattern layer 22 may be deposited on the wavelength selective scattering layer 14. In examples, the protective layer 24 may be disposed between the inked pattern layer 22 and the wavelength selective scattering layer 14. In examples, two protective layers 24 may be disposed, one above the inked pattern layer 22, and another adjacent the wavelength selective scattering layer 14.

Figure 1D:

FIG. 1D shows a lateral cross-sectional view of example article 10d. Article 10d may include the substrate 12, the wavelength selective scattering layer 14, a first sealant layer 26 and a second sealant layer 28. One of both of the first sealant layer 26 and the second sealant layer 28 may include a latex coating. The respective sealant layers may protect the integrity of the wavelength selective scattering layer 14, for example, by preventing or reducing the intrusion of moisture or other reactants or disintegrants. The respective sealant layers may also provide structural support and physical stability to the wavelength selective scattering layer 14. For example, one or both of the first sealant layer 26 and the second sealant 28 may allow the wavelength selective scattering layer 14 to be peeled off or removed from a manufacturing substrate and then transported to and applied over a product substrate, for example, over substrate 12.

Figure 1E:
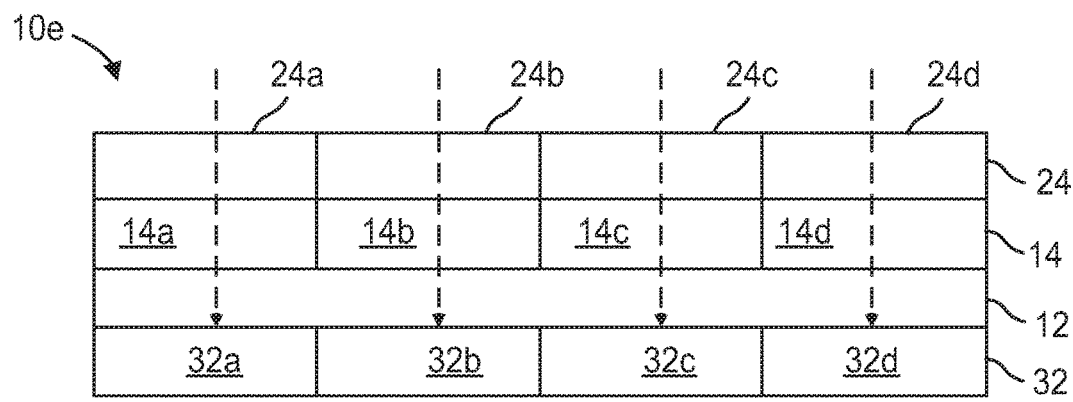

FIG. 1E shows a lateral cross-sectional view of example article 10e. Article 10e may include the substrate 12, the wavelength selective scattering layer 14 adjacent the substrate 12, and an inked pattern layer 24 deposited on the wavelength selective scattering layer 14. A sensor layer 32 including respective sensor segments 32a, 32b, 32c, and 32d may be disposed adjacent the substrate 12. In examples, the substrate 12 may be omitted, and the wavelength selective scattering layer 14 may be deposited on the sensor layer 32. In examples, the wavelength selective scattering layer 14 may include respective selective scattering segments 14a, 14b, 14c, and 14d that may be aligned with respective sensor segments 32a, 32b, 32c, and 32d. One or more of the selective scattering segments may be omitted, so that the wavelength selective scattering layer 14 may include at least one perforation that may be aligned with at least one of the respective sensor segments. Thus different selective scattering segments may be tuned by changing the near-infrared scattering ratio, the visible haze ratio, or other optical properties that may improve the performance of the sensor segment aligned with the respective selective scattering segment. While four segments are shown in the wavelength scattering layer 14 and the sensor layer 32 of FIG. 1E, in examples, the wavelength scattering layer 14 and the sensor layer 32 may have any suitable number of segments. While sensor layer 32 is described in the example of FIG. 1E, in examples, article 10e may include light sources 32a, 32b, 32c, and 32d instead of sensor segments.

Figure 1F:
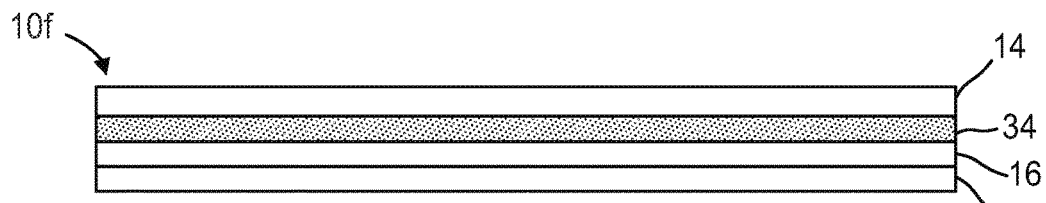
Figure 1G:
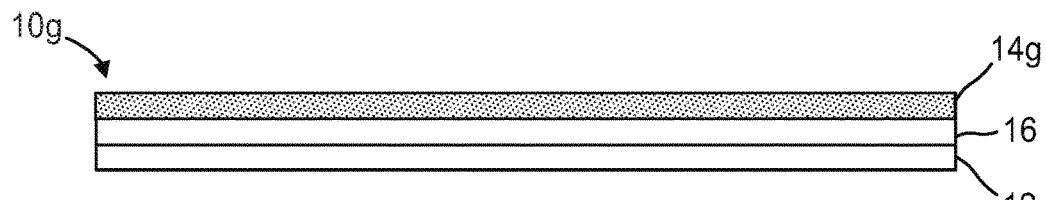

FIG. 1F shows a lateral cross-sectional view of example article 10f. Article 10f may include the substrate 12, the wavelength selective scattering layer 14, the reflective layer 16, and a wavelength selective absorbing layer 34. The reflective layer 16 may include a wavelength selective reflective layer. For example, the reflective layer 16 may include a wavelength selective interference filter or a wavelength selective multilayer optical film. In some examples, the wavelength selective absorbing layer 34 may include any suitable dye or pigment that has a greater infrared transmittance than a visible transmittance, for example, a near-infrared black ink that substantially absorbs visible wavelengths while transmitting near-infrared wavelengths. For example, the wavelength selective absorbing layer 34 may include dyes or inks such as Spectre™ inks, for example Spectre™ 100, 110, 120, 130, 140, 150, or 160 (Epolin, Newark, N.J.); Mimaki inks, for example Mimaki ES3, SS21, BS3, SS2, or HS (Mimaki Global, Tomi-city, Nagano, Japan); or Seiko inks, for example Seiko 1000, 1300, SG700, SG740, or VIC (Seiko Advance Ltd., Japan). In examples, the wavelength selective absorbing layer 34 may include one or more of cyan, magenta, yellow, or black dye components, or may include a dye having any desired color, for example, by scattering or reflecting a predetermined wavelength band, peak, or spectrum associated with a predetermined color. In some examples, the wavelength selective absorbing layer 34 may include a spectrally selective multilayer absorbing film that may have a greater infrared transmittance than a visible transmittance. In examples, a color of the wavelength selective absorbing layer 34 may be selected to tune the appearance of the article 10*f* as a whole, for example, to tune the reflected or scattered wavelengths so as to modify the apparent color of the article 10*f* exhibited by a major surface of the article 10*f*. The wavelength selective absorbing layer 34, while blocking visible wavelengths, may transmit at least some, or substantially all, near-infrared wavelengths. In some examples, the wavelength selective absorbing layer 34 may include a separate coating including one or both of a dye or a pigment. In some examples, the wavelength selective absorbing layer 34 may not include a dye, and may include a near-infrared transmissive visible blocking pigment. For example, the wavelength selective absorbing layer 34 may include Lumogen® Black FK 4280 or Lumogen Black FK 4281 (BASF, Southfield, Mich.). In some examples, the wavelength selective absorbing layer 34 may include a multilayer film, one or more of the layers of the multilayer film including one or both of a dye or a pigment. In some examples, the wavelength selective absorbing layer 34 may include or be an adhesive layer, a polymer layer, a skin layer, or any other layer of a multilayer film that includes a dye or a pigment. In some examples, article if may not include a separate wavelength selective absorbing layer 34, and instead may include a wavelength selective dye or a pigment in any other suitable layer. In some examples, the wavelength selective absorbing layer 34 or any other layer of article 10*f* may only include dye or pigment in a predetermined pattern or region. In some examples. The wavelength selective absorbing layer 34 may exhibit broadband absorption, for example, absorption over a predetermined wavelength band, by including one or more absorbing dyes or pigments that absorb at least a respective sub-band of the predetermined wavelength band.

In some examples, the wavelength selective absorbing layer 34 may include a beads or particles to be exhibit diffusing or scattering. For example, the wavelength selective absorbing layer 34 may include a medium and beads or particles dispersed in the medium. The medium may include glass, polymer, or any other suitable optical medium, or combinations thereof. The beads or particles may include silica, glass, polymeric, organic, inorganic, metal oxide, polystyrene, or other suitable scattering materials, or combinations thereof. The wavelength selective absorbing layer 34 may include diffusive or scattering voids or pores, and the voids or pores may include a gas such as air.

Thus, each respective wavelength selective layer (14, 16, 34) may transmit near-infrared wavelengths. For example, one or more of the wavelength selective layers, or the article 10*f* as a whole may have a near-infrared transmittance, for example, transmittance at wavelengths greater than 830 nm, of greater than 5%, or greater than 10%, or greater than 20%, of greater than 50%, or greater than 7%. In examples, article 10*f* may transmit less than 5%, or less than 1%, or about 0. In examples, article 10*f* may have a near-infrared transmittance of greater than 10% for wavelengths greater than 830 nm. In examples, article 10*f* may have a near-infrared transmittance of greater than 20% for wavelengths greater than 850 nm. In examples, article 10*f* may have a near-infrared transmittance of greater than 50% for wavelengths greater than 870 nm. In examples, article 10*f* may have a near-infrared transmittance of greater than 50% for wavelengths greater than 900 nm. In examples, article 10*f* may have an average near-infrared transmittance of greater than 75% for wavelengths greater than 900 nm.

In some examples, as shown in FIG. 1F, the wavelength selective absorbing layer 34 may be between the wavelength selective scattering layer 14 and the wavelength selective reflective layer 16. Positioning the wavelength selective absorbing layer 34 behind the wavelength selective scattering layer 14 may be used to tune the grey scale or apparent whiteness of the wavelength selective scattering layer 14. As discussed above, the wavelength selective absorbing layer 34 may include a non-neutral color to tune visual appearance, for example, a color coordinate in a predetermined color space. In examples, the wavelength selective absorbing layer 34 may reduce a total visible reflectance of the optical filter by a predetermined magnitude without substantially reducing a total near-infrared transmittance. While example article 10*f* includes a separate wavelength selective absorbing layer 34, in some examples, for example, example article 10*g* of FIG. 1G, a wavelength selective dye may be added to the wavelength selective scattering layer 14*g* so that wavelength selective scattering layer also acts as an absorbing layer. In examples, the wavelength selective scattering layer 14 may be disposed on top of dyed wavelength selective scattering layer 14*g*.

Figure 1H:
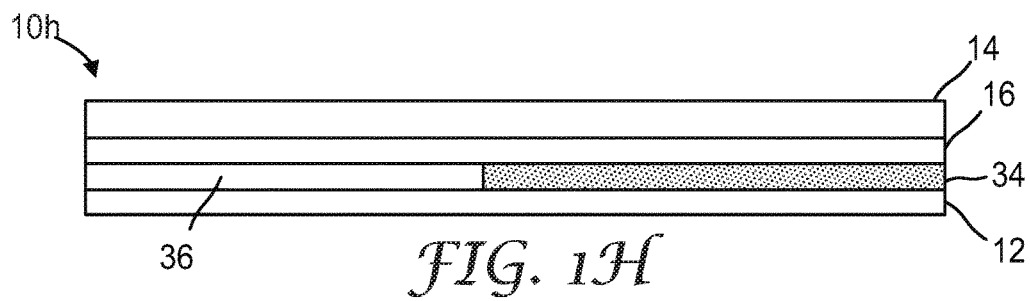

In some examples, as shown in FIG. 1H, an example article 10*h* may include the wavelength selective reflective layer 16 positioned between wavelength selective scattering layer 14 and wavelength selective absorbing layer 34. The wavelength selective absorbing layer 34 may reduce a total visible reflectance uniformly over an area of a major surface of the article 10*h*, without substantially reducing a total near-infrared transmittance. The uniform reduction in total visible reflectance may be used to reduce or prevent wet-out. Wet-out is a phenomenon that may arise from visible light leakage or transmission of visible light through all layers of article 10*h*, which may result in the appearance of visible discontinuities, disruptions, aberrations, variations, or disturbance in the uniform appearance of an optical filter. For example, regions at which an optical filter contacts an underlying substrate, may exhibit wet-out, whereby a shape corresponding to the region of contact may be perceptible through the optical filter. The wavelength selective absorbing layer 34 may uniformly reduce visible reflectance over an entire area of the article 10*h*, and prevent visible light leakage, while still allowing near-infrared wavelengths to be transmitted, such that no discontinuities or disturbances are visible across a major surface of the article 10*h*, thus avoiding wet-out.

In some examples, the wavelength selective absorbing layer 34 may occupy a complete intermediate area adjacent a major surface of wavelength selective reflective layer 16. However, in some examples, as shown in FIG. 1H, the wavelength selective absorbing layer 34 may occupy a partial region adjacent a major surface of the wavelength selective reflective layer 16, with a light diffusive layer 36 occupying the remaining regions adjacent the major surface of the wavelength selective reflective layer 16. This configuration may be used to reduce the amount of near-infrared dye that may be required to create the wavelength selective absorbing layer 34, for example, where a relatively dark or visible light absorbing component may be placed adjacent the light diffusive layer 36. In examples where a visible light absorbing component, for example, a sensor, is disposed adjacent a region of the wavelength selective reflective layer 16, no wet-out may be expected to manifest in that region. Therefore, covering that region with the wavelength selective absorbing layer 34 may not be necessary, and instead, the light diffusive layer 36 may be used adjacent that component, for example, reducing costs associated with near-infrared dye.

Figure 1I:
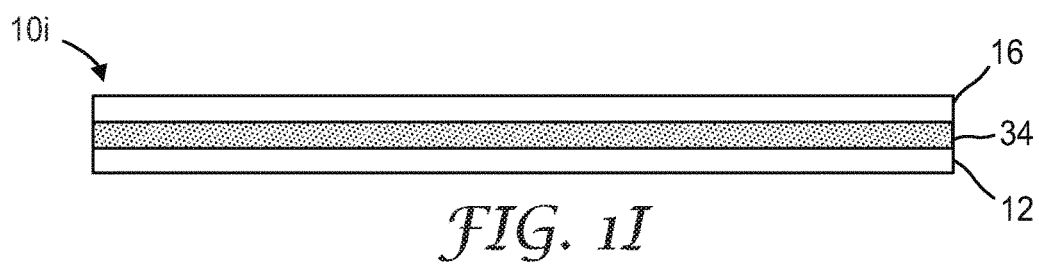
Figure 1J:
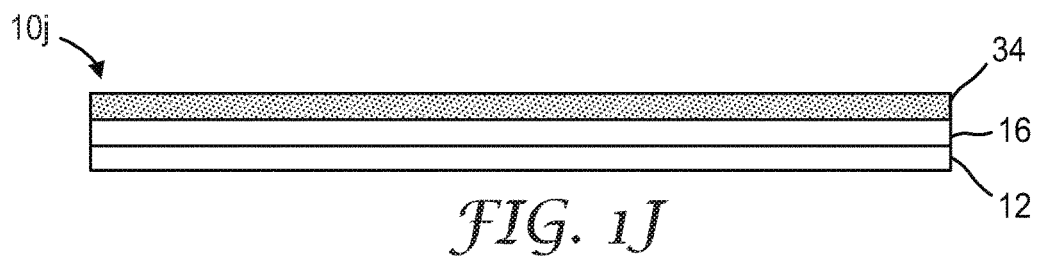
Figure 1K:
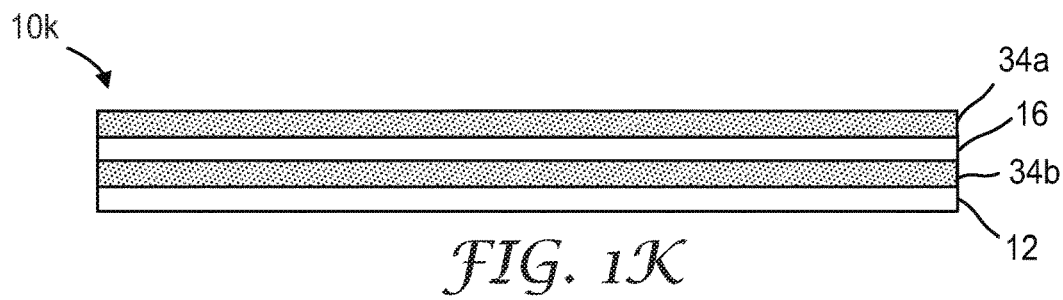

In some examples, example articles may not include the wavelength selective scattering layer 14, and may only include the wavelength selective reflective layer 16 and the wavelength selective absorbing layer 34, as shown in FIGS. 1I to 1K. In some examples, as shown in FIG. 1I, an example article 10i may include the wavelength selective reflective layer 16 disposed adjacent the substrate 12, with the wavelength selective absorbing layer 34 between the substrate 12 and the wavelength selective reflective layer 16. In some examples, as shown in FIG. 1J, an example article 10j may include the wavelength selective reflective layer 16 disposed adjacent the substrate 12, with the wavelength selective reflective layer 16 between the wavelength selective absorbing layer 34 and the substrate 12. In some examples, as shown in FIG. 1K, example article 10k may include the wavelength selective reflective layer 16 between a first wavelength selective absorbing layer 34a and a second wavelength selective absorbing layer 34b. The wavelength selective absorbing layers 34, 34a, and 34b may be used to compensate for nonuniform blocking of visible wavelengths by the wavelength selective reflective layer 16. For example, while the wavelength selective reflective layer 16 may block the transmission of a majority of visible wavelengths, the wavelength selective reflective layer 16 may still allow peaks or bands of certain visible wavelengths to pass through. Thus, wavelength selective reflective layer 16 may "leak" some visible light, which may reveal objects to be concealed by the wavelength selective reflective layer 16, for example, from visual perception. A wavelength selective dye can be selected to block at least those visible wavelengths transmitted by the wavelength selective reflective layer 16, so that the example articles 10i-10k substantially block all visible wavelengths while transmitting near-infrared wavelengths.

In examples, example articles 10i-10k may have a visible transmittance at 380-800 nm of less than 0.1% and a near-infrared transmittance at 830-900 nm of greater than 50%. In examples, example articles 10i-10k may have a visible transmittance at 380-800 nm of less than 0.01% and a near-infrared transmittance at 830-900 nm of greater than 75%. In examples, example articles 10i-10k may further include a sealant layer or a protective layer, as discussed above with reference to FIGS. 1A-1E.

While FIGS. 1A-1K show respective articles 10a-10k as including flat layers, in various examples, articles 10a-10k may assume any suitable shape, periphery, or cross-section, and layers in articles 10a-10k may assume a regular, irregular, or compound curvature, or may assume flat or curved geometries in different regions, or otherwise conform to a contour of a substrate beneath the layers or the articles 10a-10k. For example, articles 10a-10k may assume a hemispherical or lenticular shape, or a surface with an irregular contour. In some examples, any of the respective wavelength selective layers, for example, the wavelength selective scattering layer 14, the reflective layer 16, and the wavelength selective absorbing layer 34 may have a shape or thickness that varies across a major dimension, for example, by having a spatially variant or periodic pattern that covers at least some area of substrate 12 or an underlying layer, from about 1 to about 100% area. Further, while in some examples described above, articles 10a-10k of FIGS. 1A-1K may include substrate 12, in other examples, articles 10a-10k may not include substrate 12. In some examples, substrate 12 may be flexible. In some examples, articles 10a-10k may be flexible and may be disposed on a flexible substrate. For example, the flexible substrate may include a light source, a sensor, or a photovoltaic cell. In some examples, articles 10a-10k may be continuously flexible or only be flexible in predetermined regions. Thus, example articles according to examples described with reference to FIGS. 1A-1K may include optical filters that block the transmission of visible wavelengths while allowing the transmission of near-infrared wavelengths. Example articles and optical filters may be used in example optical systems described below.

Figure 2A:
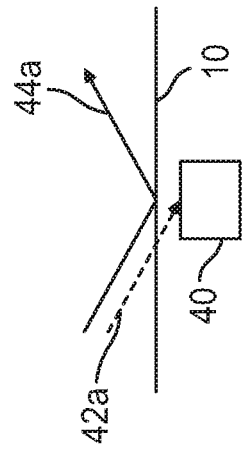
FIGS. 2A-2F are conceptual and schematic diagrams of example systems including an optical filter.

FIGS. 2A-2F are conceptual and schematic diagrams of example optical systems including an optical filter. FIG. 2A is a conceptual and schematic diagrams of an example optical system including an optical filter 10 and a light receiver 40. In examples, the light receiver 40 may include a light sensor, camera, CCD, or any other sensor configured to sense at least a predetermined wavelength region of light. For example, light receiver 40 may include a near-infrared sensor. In examples, the light receiver 40 may include an object that receives light, for example, a solar cell, or an object that at least partially absorbs incident light, for example, a solar heater or any other object that receives light. The optical filter 10 may include any of the example optical filters including a wavelength selective scattering layer, as discussed above with reference to FIGS. 1A-1E, or other example optical filters described in the disclosure. As shown in FIG. 2A, the optical filter 10 may be disposed adjacent the light receiver 40. An incident near-infrared ray 42a may include a near-infrared wavelength, and may be substantially transmitted through the optical filter 10 to the light receiver 40. An incident visible ray 44a may include a visible wavelength and may be substantially reflected or scattered by the optical filter 10, so that the light receiver 40 is at least partially shielded from the visible ray 44a, while at least partially receiving the near-infrared ray 42a. In examples, the light receiver may be substantially or completely shielded from the visible ray 44a by the optical filter 10, and may receive substantially all of near-infrared ray 42a.

Figure 2B:
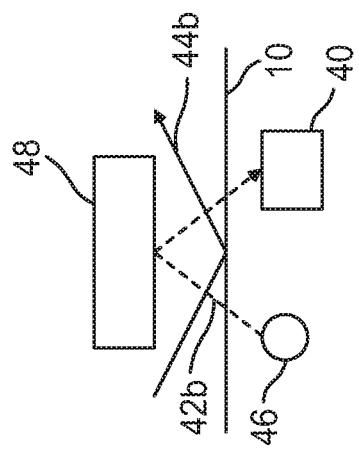

FIG. 2B is a conceptual and schematic diagrams of an example optical system including the optical filter 10, the light receiver 40, a light emitter 46, and an object 48. In examples, the light emitter 46 may include a source of any suitable wavelength of light or electromagnetic radiation, including visible, near-infrared, or ultraviolet wavelengths. In examples, the light emitter 46 may include a bulb, an incandescent light source, compact fluorescent light, LEDs, a light guide, or any natural or artificial sources of light. In examples, the light emitter 46 may not generate light, and may only reflect or transmit light generated by a light source. The optical filter 10 may be disposed between the light receiver 40 and the object 48. The light emitter may be disposed on the same side of the optical filter 10 as the light receiver 40. A near-infrared ray 42b transmitted from the light emitter 46 may include a near-infrared wavelength, and may be substantially transmitted through the optical filter 10 to the object 48. The ray 42b may be reflected back by the object 48, and the reflected ray may be modified by the optical properties of the object 48. The reflected ray 42 may be substantially transmitted through the optical filter 10 to the light receiver 40. An incident visible ray 44b may include a visible wavelength and may be substantially reflected or scattered by the optical filter 10, so that one or both of the light receiver 40 and the light emitter 46 are at least partially shielded from the visible ray 44a. In examples, the light receiver may be substantially or completely shielded from the visible ray 44b by the optical filter 10, and may receive substantially all of near-infrared ray 42b.

Figure 2C:
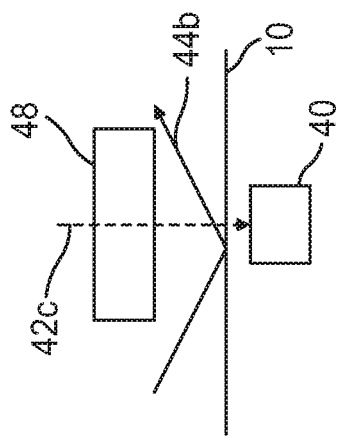

FIG. 2C is a conceptual and schematic diagrams of an example optical system including the optical filter 10, the light receiver 40, and the object 48. The optical filter 10 may be disposed between the light receiver 40 and the object 48. An incident near-infrared ray 42c may include a near-infrared wavelength, and may be substantially transmitted through the object 48 and the optical filter 10 to the light receiver 40. An incident visible ray 44c may include a visible wavelength and may be substantially reflected or scattered by the optical filter 10, so that the light receiver 40 is at least partially shielded from the visible ray 44c, while at least partially receiving the near-infrared ray 42c. In examples, the light receiver 40 may be substantially or completely shielded from the visible ray 44c by the optical filter 10, and may receive substantially all of near-infrared ray 42c.

Figure 2D:
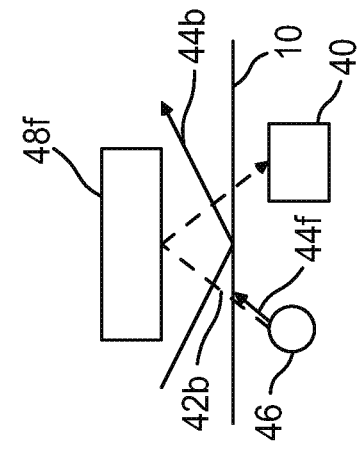

FIG. 2D is a conceptual and schematic diagrams of an example optical system including the optical filter 10 and the light receiver 40. The optical filter 10 may be disposed adjacent the light receiver 40. An incident near-infrared ray 42d may include a near-infrared wavelength, and may be substantially reflected off the optical filter 10 to the light receiver 40. An incident visible ray 44d may include a visible wavelength and may be substantially reflected or scattered by the optical filter 10, so that the light receiver 40 at least partially receives the visible ray 44d, while at least partially receiving the near-infrared ray 42d.

Figure 2E:
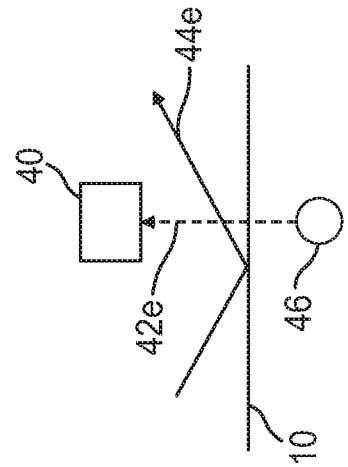

FIG. 2E is a conceptual and schematic diagrams of an example optical system including the optical filter 10, the light receiver 40, and the light emitter 46. The optical filter 10 may be disposed between the light emitter 46 and the light receiver 40. A near-infrared ray 42e transmitted from the light emitter 46 may include a near-infrared wavelength, and may be substantially transmitted through the optical filter 10 to the light receiver 40. An incident visible ray 44e may include a visible wavelength and may be substantially reflected or scattered by the optical filter 10, so that the light emitter 46 is at least partially shielded from the visible ray 44e. In examples, the light emitter 46 may be substantially or completely shielded from the visible ray 44e by the optical filter 10. While the light receiver 40 is described in the example optical system of FIG. 2E, in examples, the example optical system of FIG. 2E may not include a light receiver 40. For example, the example optical system may include the light emitter 46 and the optical filter 10, and the optical filter 10 may conceal the light emitter 46 from visible appearance.

Figure 2F:
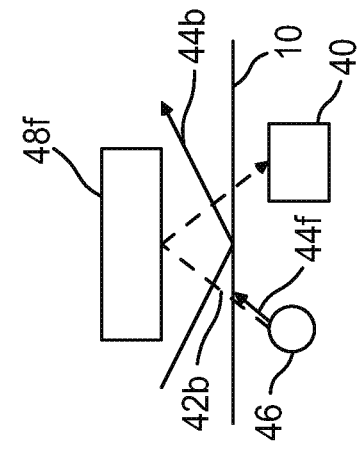

FIG. 2F is a conceptual and schematic diagrams of an example optical system including the optical filter 10, the light receiver 40, a light emitter 46, and an object 48f. In examples, the light emitter 46 may include a source of near-infrared wavelengths, for example, a near-infrared bulb or LED. For example, the light emitter may include a laser, a laser diode, or an injection laser. The light receiver 40 may include a sensor or camera sensitive to near-infrared wavelengths. For example, the sensor may include a gesture sensor, an optical touch sensor, or a photoelectric sensor such as a sensor that detects a disruption in a continuously sensed light beam. The sensor may include an array or any other group of one kind or different kinds of sensors. The optical filter 10 may be disposed between the light receiver 40 and the object 48f. The light emitter 46 may be disposed on the same side of the optical filter 10 as the light receiver 40. A near-infrared ray 42b transmitted from the light emitter 46 may include a near-infrared wavelength, and may be substantially transmitted through the optical filter 10 to the object 48f. The ray 42b may be reflected back by the object 48, and the reflected ray may be modified by the optical properties of the object 48f. The reflected ray 42 may be substantially transmitted through the optical filter 10 to the light receiver 40. In some examples, an incident visible ray 44b may include a visible wavelength and may be substantially reflected or scattered by the optical filter 10, so that one or both of the light receiver 40 and the light emitter 46 are at least partially shielded from the visible ray 44a. In examples, the light receiver may be substantially or completely shielded from the visible ray 44b by the optical filter 10, and may receive substantially all of near-infrared ray 42b.

In some examples, an iris scanning system may include the example optical system of FIG. 2F, for example, where object 48f includes an eye or iris, and the light receiver 40 is an iris scanner that receives near-infrared light emitted by the light emitter 46 and bounced back by object 48f. While the light emitter 46 may emit near-infrared wavelengths, the light emitter 46 may also emit visible wavelengths that may reveal the presence of the light emitter 46, for example, to a user or viewer. While articles including a wavelength selective layer 16 may be used to block the transmission of visible wavelengths to camouflage the light emitter 46 from a visible perception, wavelength selective reflective layer 16 may allow some visible wavelengths, for example, peaks or bands of visible wavelengths, to be transmitted. In some examples, optical filter 10 may include a wavelength selective absorbing layer 34 that blocks the transmission of visible wavelengths transmitted by the wavelength selective reflective layer 16, as discussed above with reference to FIGS. 1*i*-1*k*. Thus, in examples, the optical filter 10 may have a visible transmittance at 380-800 nm of less than 0.1% and a near-infrared transmittance at 830-900 nm of greater than 50%. Therefore, optical filter 10 may camouflage the light emitter 46 from visible perception, even if light emitter 46 emits visible wavelengths, while allowing the iris scanning system to scan the iris by transmitting near-infrared wavelengths in both directions across optical filter 10. In some examples, the example optical system of FIG. 2F may include more than one optical filter 10. For example, a first optical filter may be disposed adjacent the light emitter 46 or the light receiver 40, and a second optical filter may be disposed adjacent a major surface of object 48f. In some examples, the first and second optical filter respective include the same or different optical filters. In some examples, the optical filter 10 may include a retroreflective film or may be disposed across or along a retroreflective path. In some examples, the object 48f may include a retroreflective film. While an iris scanning system is described above with reference to FIG. 2F, in some examples, the example of FIG. 2F may include any biometric or identification system that uses near-infrared wavelengths for identification, while emitting visible wavelengths to be concealed or camouflaged from a visible perception. For example, the example system of FIG. 2F may include a fingerprint scanner, a facial recognition system, or a thermal recognition system.

In examples, the optical filter 10 may include at least one removable or repositionable layer, or optical filter 10 as a whole may be removable or repositionable, so that it can be removed or repositioned relative to a substrate underneath or adjacent the optical filter 10. In examples, the periphery of the optical filter 10 may extend beyond the periphery of one or both the light emitter 46 or the light receiver 40, or the area of a major surface of the optical filter 10 may be greater or smaller than a surface area of one or both of the light emitter 46 or the light receiver 40. In examples, the optical filter 10 may be configured to camouflage other components, such as electronics, circuitry, substrates, sensors, transmitters by shielding those components by the optical filter from a visual perception. In examples, more than one light emitter 46 or light receiver 40, for example, an array, could be positioned adjacent the optical filter 10. In examples, one or both of the light emitter 46 or the light receiver 40 may be relatively remote from the optical filter 10, for example, at least 1 cm away, or 10 cm away, or 1 m away or, 10 m away, or 100 m away, or 1 km away, or even further remote. While a direct path for light is shown in FIGS. 2A-2F, for example, between one or both of the light emitter 46 and the light receiver 40 and the optical filter 10, in examples, light between one or both of the light emitter 46 and the light receiver 40 and the optical filter 10 may follow indirect paths, including optically guided paths, reflected paths, or paths including optical manipulation including refraction or filtering, or paths that travel through different optical media.

Thus, in examples, the optical filter 10 may be configured to at least partially shield the light receiver 40 from visible wavelengths while substantially allowing the light receiver 40 to receive near-infrared wavelengths. For example, optical filter 10 may be configured to conceal or camouflage one or more of the light receiver 40, light emitter 46, or object 48. In examples, the optical filter 10 may be configured to camouflage one or both of the light receiver 40 or the light emitter 46 from a visual perception, for example, by scattering visible wavelengths as discussed above with reference to FIGS. 2A-2F.

FIGS. 3A-3D are conceptual diagrams of an example system including an example optical filter and an electronic display displaying a visibly perceptible pattern and an invisible near-infrared pattern. Since imaging sensors such as charge-coupled devices (CCD) detect in the near-infrared region, it would be possible to produce a sign including a visibly reflective graphic. The sign could conceal an invisible image that is detectable by the camera. For example, the image could include a predetermined pattern that encodes a signal or information, such as a bar code, a 2D bar code, or a QR code. The physical size of QR codes may limit the amount of information they may contain. However an invisible QR code could be physically as large as the sign without cluttering or compromising the visible graphic. In an example, an electronic display 60 may be capable of simultaneously displaying visible and near-infrared patterns emitted by respective visible and near-infrared light emitters concealed behind the display 60. The electronic display 60 may be covered with an example optical filter described above with reference to FIGS. 1A-1E. For example, the electronic display 60 may simultaneously display a pattern 62 that is visible and an invisible near-infrared pattern 64, as shown in FIG. 3B. The pattern 62 may include a relatively smaller QR code or other indicia with a relatively smaller display footprint, while the pattern 64 may include a relatively larger QR code or other indicia with a relatively larger footprint. The pattern 62 may be visible as a result of reflection or scattering of visible wavelengths by the optical filter (not shown). As seen in FIG. 3A, only pattern 62 may be visibly perceived, and pattern 64 may remain invisible to visual perception, while being presented with relatively high clarity in near-infrared wavelengths. A camera capable of sensing near-infrared wavelengths may thus sense pattern 64 with sufficient resolution, for example, with a resolution sufficient to decode information that may be contained in pattern 64. In the example shown in FIG. 3C only a predetermined pattern may be visibly perceptible on display 60, while an invisible near-infrared pattern only detectable by a near-infrared camera may be simultaneously displayed on the display 60, as shown in FIG. 3D. Thus, in the respective example systems of 3A and 3B, and 3C and 3D, an example optical filter may be used to conceal or camouflage a source of a near-infrared pattern while revealing only a predetermined visible pattern. In some examples, the invisible near-infrared patterns 64 may be used to encode concealed information, while the visibly perceptible patterns 62 may be used to present visibly perceptible information, or at least information that may be encoded, but is visibly perceptible as being encoded. For example, pattern 62 may encode a first set of information, such as a website, while pattern 64 may encode a second set of information, such as a location of the display 60. In examples, the electronic display 60 may display a visible pattern, an invisible pattern, or both. In examples, the electronic display 60 may display multiple patterns. In examples, the electronic display may display static patterns or dynamic patterns. Thus, example optical filters may provide camouflage with high clarity near-infrared transmission.

Figure 4:
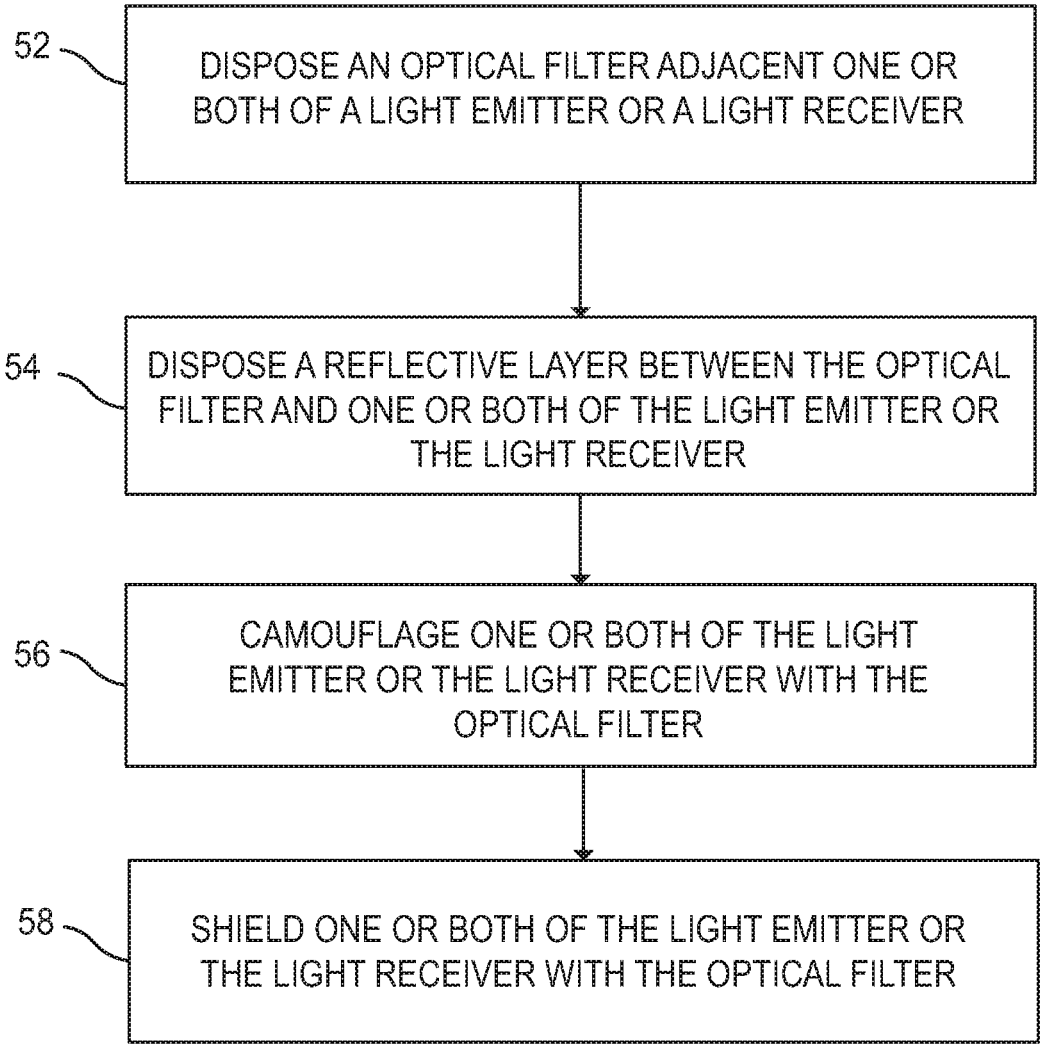
FIG. 4 is a flowchart of an example technique.

FIG. 4 is a flowchart of an example technique. The example technique may include disposing an optical filter 10 adjacent one or both of the light emitter 46 or the light receiver 40 (52). The optical filter 10 includes a wavelength selective scattering layer, as discussed above with reference to FIGS. 1A-1E and FIGS. 2A-2E. The example technique may optionally further include disposing the reflective layer 16 between the optical filter 10 and one or both of the light emitter 46 or the light receiver 40 (54). The optical filter 10 may optionally camouflage one or both of the light emitter 46 or the light receiver 40 (56). The optical filter 10 may optionally at least partially shield one or both of the light emitter or the light receiver from visible wavelengths (58).

While articles described above may include multilayer films or may include multiple layers, in some examples, one or more layer may be blended into an adjacent layer, or may form a visibly indistinct graded boundary with an adjacent layer. In some examples, the multilayer films or articles may be processed such that no discernible boundaries or major surfaces separate one or more layers, and different layers may transition into adjacent layers. In some examples, a layer may signify a predetermined substantially planar or curved geometric region rather than a physically distinct or discrete layer.

Thus, example systems, articles, and techniques according to the present disclosure may include example optical articles including example wavelength selective scattering layers that transmit near-infrared light with relatively high clarity while reducing the transmission of visible wavelengths, for example, by selectively scattering or reflecting visible wavelengths.

Example articles and techniques according to the disclosure provide will be illustrated by the following non-limiting embodiments and examples.

EMBODIMENTS

Embodiments of the invention include the following enumerated items.

Item 1. A system comprising:

one or both of a light emitter or a light receiver; and an optical filter adjacent one or both of the light emitter or the light receiver, wherein the optical filter comprises a wavelength selective scattering layer, wherein the wavelength selective scattering layer has a near-infrared scattering ratio of less than about 0.9, the near-infrared scattering ratio being a ratio of an average near-infrared scattering to an average visible scattering, and wherein the wavelength selective scattering layer has a visible reflective haze ratio of greater than about 0.5, the visible reflective haze ratio being a ratio of an average visible diffusive reflectance to an average visible total reflectance.

Item 2. The system of item 1, wherein the wavelength selective scattering layer has a near-infrared scattering ratio of less than about 0.7.

Item 3. The system of item 1, wherein the wavelength selective scattering layer has a near-infrared scattering ratio of less than about 0.6.

Item 4. The system of any one of items 1 to 3, wherein the wavelength selective scattering layer has a visible reflective haze ratio of greater than about 0.6.

Item 5. The system of any one of items 1 to 4, wherein the wavelength selective scattering layer has a visible reflective haze ratio of greater than about 0.7.

Item 6. The system of any one of items 1 to 5, wherein one or both of the light emitter or the light receiver have an operating wavelength within a near-infrared range.

Item 7. The system of any one of items 1 to 6, wherein the wavelength selective scattering layer transmits less than about 50% of incident visible light, and wherein the wavelength selective scattering layer transmits greater than about 50% of incident near-infrared light.

Item 8. The system of any one of items 1 to 7, wherein the wavelength selective scattering layer scatters greater than about 50% of incident visible light.

Item 9. The system of any one of items 1 to 8, wherein the wavelength selective scattering layer scatters greater than about 50% of incident visible light as white light.

Item 10. The system of any one of items 1 to 9, wherein the wavelength selective scattering layer comprises an optical medium have a first refractive index, wherein the optical medium comprises a plurality of particles, wherein the plurality of particles has a second refractive index and an average particle size of less than about 5 μm, and wherein an absolute difference between the first refractive index and the second refractive index is less than about 0.1.

Item 11. The system of any one of items 1 to 9, wherein the wavelength selective scattering layer comprises an optical medium have a first refractive index, wherein the optical medium comprises a plurality of particles, wherein the plurality of particles has a second refractive index and an average particle size of less than about 1 μm, and wherein an absolute difference between the first refractive index and the second refractive index is less than about 0.2.

Item 12. The system of any one of items 1 to 9, wherein the wavelength selective scattering layer comprises an optical medium have a first refractive index, wherein the optical medium comprises a plurality of particles, wherein the plurality of particles has a second refractive index and an average particle size of less than about 0.5 μm, and wherein an absolute difference between the first refractive index and the second refractive index is less than about 0.4.

Item 13. The system of any one of items 1 to 9, wherein the wavelength selective scattering layer comprises an optical medium have a first refractive index, wherein the optical medium comprises a plurality of particles, wherein the plurality of particles has a second refractive index and an average particle size of less than about 0.3 μm, and wherein an absolute difference between the first refractive index and the second refractive index is less than about 0.6.

Item 14. The system of any one of items 1 to 9, wherein the wavelength selective scattering layer comprises an optical medium have a first refractive index, wherein the optical medium comprises a plurality of particles, wherein the plurality of particles has a second refractive index and an average particle size of less than about 0.2 μm, and wherein an absolute difference between the first refractive index and the second refractive index is less than about 1.8.

Item 15. The system of any one of items 1 to 9, wherein the wavelength selective scattering layer comprises an optical medium have a first refractive index, wherein the optical medium comprises a plurality of particles, wherein the plurality of particles has a second refractive index, wherein an average particle size of the plurality of particles, the first refractive index, and the second refractive index are selected from a region under line 82 of FIG. 15.

Item 16. The system of any one of items 1 to 9, wherein the wavelength selective scattering layer comprises an optical medium have a first refractive index, wherein the optical medium comprises a plurality of particles, wherein the plurality of particles has a second refractive index, wherein an average particle size of the plurality of particles, the first refractive index, and the second refractive index are selected from a region under line 84 of FIG. 15.

Item 17. The system of any one of items 1 to 9, wherein the wavelength selective scattering layer comprises an optical medium have a first refractive index, wherein the optical medium comprises a plurality of particles, wherein the plurality of particles has a second refractive index, wherein an average particle size of the plurality of particles, the first refractive index, and the second refractive index are selected from a region under line 86 of FIG. 15.

Item 18. The system of any one of items 1 to 9, wherein the wavelength selective scattering layer comprises an optical medium have a first refractive index, wherein the optical medium comprises a plurality of particles, wherein the plurality of particles has a second refractive index, wherein an average particle size of the plurality of particles, the first refractive index, and the second refractive index are selected from a region under line 88 of FIG. 15.

Item 19. The system of any one of items 1 to 18, wherein the wavelength selective scattering layer has a visible haze of at least 25%.

Item 20. The system of any one of items 1 to 19, wherein the optical filter comprises surface optical microstructures.

Item 21. The system of any one of items 1 to 20, wherein the light emitter comprises a near-infrared LED or a near-infrared laser.

Item 22. The system of any one of items 1 to 21, wherein the light receiver comprises a near-infrared camera or a light sensor having a near-infrared receiving band.

Item 23. The system of any one of items 1 to 9, wherein the wavelength selective scattering layer comprises a binder, a plurality of particles, and a plurality of interconnected voids, wherein a volume fraction of the plurality of interconnected voids in the wavelength selective scattering layer is not less than about 20%, and wherein a weight ratio of the binder to the plurality of the particles is not less than about 1:2.

Item 24. The system of any one of items 1 to 23, wherein the optical filter comprises a reflective layer.

Item 25. The system of any one of items 1 to 23, wherein the optical filter comprises a beaded diffuser layer.

Item 26. The system of any one of items 1 to 25, wherein the optical filter is configured to at least partially shield the light receiver from visible wavelengths while substantially allowing the light receiver to receive near-infrared wavelengths.

Item 27. The system of any one of items 1 to 26, wherein the optical filter is configured to camouflage one or both of the light receiver or the light emitter from a visual perception.

Item 28. The system of item 27, wherein the optical filter is configured to at least partially camouflage one or both of the light receiver or the light emitter from a visual perception by scattering visible wavelengths.

Item 29. A method comprising:
disposing an optical filter adjacent one or both of a light emitter or a light receiver, wherein the optical filter comprises a wavelength selective scattering layer, wherein the wavelength selective scattering layer has a near-infrared scattering ratio of less than about 0.9, the near-infrared scattering ratio being a ratio of an average near-infrared scattering to an average visible scattering, and wherein the wavelength selective scattering layer has a visible reflective haze ratio of greater than about 0.5, the visible reflective haze ratio being a ratio of an average visible diffusive reflectance to an average visible total reflectance.

Item 30. The method of item 29, further comprising disposing a reflective layer between the optical filter and one or both of the light emitter or the light receiver.

Item 31. A method comprising at least partially camouflaging one or both of the light emitter or the light receiver, the camouflaging comprising the method of item 29 or 30.

Item 32. A method comprising at least partially shielding one or both of the light emitter or the light receiver from visible wavelengths, the shielding comprising the method of item 29 or 30.

Item 33. The method of any one of items 29 to 32, wherein the wavelength selective scattering layer scatters greater than about 50% of incident visible light.

Item 34. The method of item 33, wherein the wavelength selective scattering layer scatters greater than about 50% of incident visible light as white light.

Item 35. An article comprising an optical filter, wherein the optical filter comprises a wavelength selective scattering layer, wherein the wavelength selective scattering layer has a near-infrared scattering ratio of less than about 0.9, the near-infrared scattering ratio being a ratio of an average near-infrared scattering to an average visible scattering, and wherein the wavelength selective scattering layer has a visible reflective haze ratio of greater than about 0.5, the visible reflective haze ratio being a ratio of an average visible diffusive reflectance to an average visible total reflectance.

Item 36. The article of item 35, wherein the wavelength selective scattering layer has a near-infrared scattering ratio of less than about 0.7.

Item 37. The article of item 36, wherein the wavelength selective scattering layer has a near-infrared scattering ratio of less than about 0.6.

Item 38. The article of any one of items 35 to 37, wherein the wavelength selective scattering layer has a visible reflective haze ratio of greater than about 0.6.

Item 39. The article of any one of items 35 to 37, wherein the wavelength selective scattering layer has a visible reflective haze ratio of greater than about 0.7.

Item 40. The article of any one of items 35 to 39, wherein the wavelength selective scattering layer transmits less than about 50% of incident visible light, and wherein the wavelength selective scattering layer transmits greater than about 50% of incident near-infrared light.

Item 41. The article of any one of items 35 to 40, wherein the wavelength selective scattering layer scatters greater than about 50% of incident visible light.

Item 42. The article of any one of items 35 to 40, wherein the wavelength selective scattering layer scatters greater than about 50% of incident visible light as white light.

Item 43. The article of any one of items 35 to 42, wherein the wavelength selective scattering layer comprises an optical medium have a first refractive index, wherein the optical medium comprises a plurality of particles, wherein the plurality of particles has a second refractive index and an average particle size of less than about 5 μm, and wherein an absolute difference between the first refractive index and the second refractive index is less than about 0.1.

Item 44. The article of any one of items 35 to 42, wherein the wavelength selective scattering layer comprises an optical medium have a first refractive index, wherein the optical medium comprises a plurality of particles, wherein the plurality of particles has a second refractive index and an average particle size of less than about 1 μm, and wherein an absolute difference between the first refractive index and the second refractive index is less than about 0.2.

Item 45. The article of any one of items 35 to 42, wherein the wavelength selective scattering layer comprises an optical medium have a first refractive index, wherein the optical medium comprises a plurality of particles, wherein the plurality of particles has a second refractive index and an average particle size of less than about 0.5 μm, and wherein an absolute difference between the first refractive index and the second refractive index is less than about 0.4.

Item 46. The article of any one of items 35 to 42, wherein the wavelength selective scattering layer comprises an optical medium have a first refractive index, wherein the optical medium comprises a plurality of particles, wherein the plurality of particles has a second refractive index and an average particle size of less than about 0.3 μm, and wherein an absolute difference between the first refractive index and the second refractive index is less than about 0.6.

Item 47. The article of any one of items 35 to 42, wherein the wavelength selective scattering layer comprises an optical medium have a first refractive index, wherein the optical medium comprises a plurality of particles, wherein the plurality of particles has a second refractive index and an average particle size of less than about 0.2 μm, and wherein an absolute difference between the first refractive index and the second refractive index is less than about 1.8.

Item 48. The article of any one of items 35 to 42, wherein the wavelength selective scattering layer comprises an optical medium have a first refractive index, wherein the optical medium comprises a plurality of particles, wherein the plurality of particles has a second refractive index, wherein an average particle size of the plurality of particles, the first refractive index, and the second refractive index are selected from a region under line 82 of FIG. 15.

Item 49. The article of any one of items 35 to 42, wherein the wavelength selective scattering layer comprises an optical medium have a first refractive index, wherein the optical medium comprises a plurality of particles, wherein the plurality of particles has a second refractive index, wherein an average particle size of the plurality of particles, the first refractive index, and the second refractive index are selected from a region under line 84 of FIG. 15.

Item 50. The article of any one of items 35 to 42, wherein the wavelength selective scattering layer comprises an optical medium have a first refractive index, wherein the optical medium comprises a plurality of particles, wherein the plurality of particles has a second refractive index, wherein an average particle size of the plurality of particles, the first refractive index, and the second refractive index are selected from a region under line 86 of FIG. 15.

Item 51. The article of any one of items 35 to 42, wherein the wavelength selective scattering layer comprises an optical medium have a first refractive index, wherein the optical medium comprises a plurality of particles, wherein the plurality of particles has a second refractive index, wherein an average particle size of the plurality of particles, the first refractive index, and the second refractive index are selected from a region under line 88 of FIG. 15.

Item 52. The article of any one of items 35 to 51, wherein the wavelength selective scattering layer has a visible haze of at least 25%.

Item 53. The article of any one of items 35 to 52, wherein the optical filter comprises surface optical microstructures.

Item 54. The article of any one of items 35 to 42, wherein the wavelength selective scattering layer comprises a binder, a plurality of particles, and a plurality of interconnected voids, wherein a volume fraction of the plurality of interconnected voids in the wavelength selective scattering layer is not less than about 20%, and wherein a weight ratio of the binder to the plurality of the particles is not less than about 1:2.

Item 55. The article of any one of items 35 to 54, wherein the optical filter comprises a reflective layer.

Item 56. The article of any one of items 35 to 55, wherein the optical filter comprises a beaded diffuser layer.

Item 57. The article of any one of items 35 to 56, wherein the optical filter is configured to at least partially shield a light receiver from visible wavelengths while allowing the light receiver to at least partially receive near-infrared wavelengths.

Item 58. The article of any one of items 35 to 56, wherein the optical filter is configured to at least partially camouflage one or both of a light receiver and a light emitter from a visual perception.

Item 59. The article of item 58, wherein the optical filter is configured to at least partially camouflage one or both of the light receiver or the light emitter from a visual perception by at least partially scattering visible wavelengths.

Item 60. The article of any one of items 35 to 59, wherein the optical filter comprises an ink receptive coating adjacent the wavelength selective scattering layer.

Item 61. The article of any one of items 35 to 60, wherein the optical filter comprises an inked pattern disposed on the ink receptive coating.

Item 62. The article of any one of items 35 to 61, wherein the optical filter comprises a sealant layer.

Item 63. The article of any one of items 35 to 62, wherein the optical filter comprises a protective coating.

Item 64. The article of any one of items 35 to 63, wherein the wavelength selective scattering layer has a total visible reflectance of at least 50%.

Item 65. The article of item 64, wherein the wavelength selective scattering layer has a total visible reflectance of at least 60%.

Item 66. The article of item 65, wherein the wavelength selective scattering layer has a total visible reflectance of at least 70%.

Item 67. An article comprising an optical filter, wherein the optical filter comprises a wavelength selective scattering layer, wherein the wavelength selective scattering layer has an average near-infrared scattering of less than 60%, wherein the wavelength selective scattering layer has an average visible scattering of greater than 10%, and wherein a difference between the % total visible reflectance and the % diffuse visible reflectance is less than 20.

Item 68. The article of item 67, wherein the wavelength selective scattering layer has an average near-infrared scattering of less than 40%, wherein the wavelength selective scattering layer has an average visible scattering of greater than 58%, and wherein the difference between the % total visible reflectance and the % diffuse visible reflectance is less than 18.

Item 69. A system comprising:
one or both of a light emitter or a light receiver; and
an optical filter adjacent one or both of the light emitter or the light receiver, wherein the optical filter comprises:
a wavelength selective scattering layer, wherein the wavelength selective scattering layer is configured to substantially scatter visible wavelengths,
a wavelength selective reflective layer, and
at least one wavelength selective absorbing layer, wherein each respective wavelength selective layer is configured to transmit near-infrared wavelengths.

Item 70. The system of item 69, wherein the optical filter has a visible transmittance of less than 5% and a near-infrared transmittance of greater than 5% for wavelengths greater than 830 nm.

Item 71. The system of item 70, wherein the optical filter has a visible transmittance of less than 1%.

Item 72. The system of item 70 or 71, wherein the optical filter has a near-infrared transmittance of greater than 10% for wavelengths greater than 830 nm.

Item 73. The system of item 72, wherein the optical filter has a near-infrared transmittance of greater than 20% for wavelengths greater than 850 nm.

Item 74. The system of item 73, wherein the optical filter has a near-infrared transmittance of greater than 50% for wavelengths greater than 870 nm.

Item 75. The system of item 74, wherein the optical filter has a near-infrared transmittance of greater than 50% for wavelengths greater than 900 nm.

Item 76. The system of item 75, wherein the optical filter has an average near-infrared transmittance of greater than 75% for wavelengths greater than 900 nm.

Item 77. The system of any one of items 69 to 76, wherein the wavelength selective scattering layer has a near-infrared scattering ratio of less than about 0.9, the near-infrared scattering ratio being a ratio of an average near-infrared scattering to an average visible scattering, and wherein the wavelength selective scattering layer has a visible reflective haze ratio of greater than about 0.5, the visible reflective haze ratio being a ratio of an average visible diffusive reflectance to an average visible total reflectance.

Item 78. The system of any one of items 69 to 76, wherein the wavelength selective scattering layer has an average near-infrared scattering of less than 60%, wherein the wavelength selective scattering layer has an average visible scattering of greater than 10%, and wherein a difference between the % total visible reflectance and the % diffuse visible reflectance is less than 20.

Item 79. The system of any one of items 69 to 76, wherein the wavelength selective scattering layer transmits less than about 50% of incident visible light, and wherein the wavelength selective scattering layer transmits greater than about 50% of incident near-infrared light.

Item 80. The system of any one of items 69 to 79, wherein the wavelength selective scattering layer comprises a binder, a plurality of particles, and a plurality of interconnected voids, wherein a volume fraction of the plurality of interconnected voids in the wavelength selective scattering layer is not less than about 20%, and wherein a weight ratio of the binder to the plurality of the particles is not less than about 1:2.

Item 81. The system of any one of items 69 to 80, wherein the light emitter comprises a near-infrared LED or a near-infrared laser.

Item 82. The system of any one of items 69 to 81, wherein the light receiver comprises a near-infrared camera or a light sensor having a near-infrared receiving band.

Item 83. The system of any one of items 69 to 82, wherein the reflective layer comprises a multilayer optical film.

Item 84. The system of any one of items 69 to 83, wherein the reflective layer comprises a wavelength selective interference filter.

Item 85. The system of any one of items 69 to 84, wherein the optical filter is disposed on a substrate layer.

Item 86. The system of any one of items 69 to 85, wherein the optical filter is configured to at least partially shield the light receiver from visible wavelengths while substantially allowing the light receiver to receive near-infrared wavelengths.

Item 87. The system of any one of items 69 to 86, wherein the optical filter is configured to camouflage one or both of the light receiver or the light emitter from a visual perception.

Item 88. The system of item 87, wherein the optical filter is configured to at least partially camouflage one or both of the light receiver or the light emitter from a visual perception by scattering visible wavelengths.

Item 89. The system of any one of items 69 to 88, wherein the wavelength selective absorbing layer is between the wavelength selective scattering layer and the wavelength selective reflective layer, and wherein the wavelength selective absorbing layer is configured to reduce a total visible reflectance of the optical filter by a predetermined magnitude without substantially reducing a total near-infrared transmittance.

Item 90. The system of any one of items 69 to 88, wherein the wavelength selective reflective layer is between the wavelength selective scattering layer and the wavelength selective absorbing layer, and wherein the wavelength selective absorbing layer is configured to reduce a total visible reflectance uniformly over an area of a major surface of the optical filter without substantially reducing a total near-infrared transmittance.

Item 91. An article comprising an optical filter, wherein the optical filter comprises:
a wavelength selective scattering layer, wherein the wavelength selective scattering layer is configured to substantially scatter visible wavelengths,
a wavelength selective reflective layer, and
at least one wavelength selective absorbing layer, wherein each respective wavelength selective layer is configured to transmit near-infrared wavelengths.

Item 92. The article of item 91, wherein the optical filter has a visible transmittance of less than 5% and a near-infrared transmittance of greater than 5% for wavelengths greater than 830 nm.

Item 93. The article of item 92, wherein the optical filter has a visible transmittance of less than 1%.

Item 94. The article of items 92 or 93, wherein the optical filter has a near-infrared transmittance of greater than 10% for wavelengths greater than 830 nm.

Item 95. The article of item 94, wherein the optical filter has a near-infrared transmittance of greater than 20% for wavelengths greater than 850 nm.

Item 96. The article of item 95, wherein the optical filter has a near-infrared transmittance of greater than 50% for wavelengths greater than 870 nm.

Item 97. The article of item 96, wherein the optical filter has a near-infrared transmittance of greater than 50% for wavelengths greater than 900 nm.

Item 98. The article of item 97, wherein the optical filter has an average near-infrared transmittance of greater than 75% for wavelengths greater than 900 nm.

Item 99. The article of any one of items 91 to 98, wherein the wavelength selective scattering layer has a near-infrared scattering ratio of less than about 0.9, the near-infrared scattering ratio being a ratio of an average near-infrared scattering to an average visible scattering, and wherein the wavelength selective scattering layer has a visible reflective haze ratio of greater than about 0.5, the visible reflective haze ratio being a ratio of an average visible diffusive reflectance to an average visible total reflectance.

Item 100. The article of any one of items 91 to 99, wherein the wavelength selective scattering layer has an average near-infrared scattering of less than 60%, wherein the wavelength selective scattering layer has an average visible scattering of greater than 10%, and wherein a difference between the % total visible reflectance and the % diffuse visible reflectance is less than 20.

Item 101. The article of any one of items 91 to 100, wherein the wavelength selective scattering layer transmits less than about 50% of incident visible light, and wherein the wavelength selective scattering layer transmits greater than about 50% of incident near-infrared light.

Item 102. The article of any one of items 91 to 101, wherein the wavelength selective scattering layer comprises a binder, a plurality of particles, and a plurality of interconnected voids, wherein a volume fraction of the plurality of interconnected voids in the wavelength selective scattering layer is not less than about 20%, and wherein a weight ratio of the binder to the plurality of particles is not less than about 1:2.

Item 103. The article of any one of items 91 to 102, wherein the reflective layer comprises a multilayer optical film.

Item 104. The article of any one of items 91 to 103, wherein the reflective layer comprises a wavelength selective interference filter.

Item 105. The article of any one of items 91 to 104, wherein the optical filter is disposed on a substrate layer.

Item 106. The article of any one of items 91 to 105, wherein the optical filter comprises an ink receptive coating adjacent the wavelength selective scattering layer.

Item 107. The article of item 106, wherein the optical filter comprises an inked pattern disposed on the ink receptive coating.

Item 108. The article of any one of items 91 to 107, wherein the optical filter comprises a sealant layer.

Item 109. The article of any one of items 91 to 107, wherein the optical filter comprises a protective coating.

Item 110. The article of any one of items 91 to 109, wherein the wavelength selective absorbing layer is between the wavelength selective scattering layer and the wavelength selective reflective layer, and wherein the wavelength selective absorbing layer is configured to reduce a total visible reflectance of the optical filter by a predetermined magnitude without substantially reducing a total near-infrared transmittance.

Item 111. The article of any one of items 91 to 109, wherein the wavelength selective reflective layer is between the wavelength selective scattering layer and the wavelength selective absorbing layer, and wherein the wavelength selective absorbing layer is configured to reduce a total visible reflectance uniformly over an area of a major surface of the optical filter without substantially reducing a total near-infrared transmittance.

Item 112. A system comprising:
one or both of a light emitter or a light receiver; and
an optical filter adjacent one or both of the light emitter or the light receiver, wherein the optical filter comprises:
a wavelength selective reflective layer, and at least one wavelength selective absorbing layer, wherein each respective wavelength selective layer is configured to transmit near-infrared wavelengths, and wherein the optical filter has a visible transmittance at 380-800 nm of less than 0.1% and a near-infrared transmittance at 830-900 nm of greater than 50%.

Item 113. The system of item 112, wherein the optical filter has a visible transmittance at 380-800 nm of less than 0.01% and a near-infrared transmittance at 830-900 nm of greater than 75%.

Item 114. The system of items 112 or 113, wherein the light emitter comprises a near-infrared LED or a near-infrared laser.

Item 115. The system of any one of items 112 to 114, wherein the light receiver comprises a near-infrared camera or a light sensor having a near-infrared receiving band.

Item 116. The system of any one of items 112 to 115, wherein the light receiver comprises an iris scanning system.

Item 117. A system comprising an iris-based identification system, comprising the system of any one of items 112 to 116.

Item 118. The system of any one of items 112 to 117, wherein the reflective layer comprises a wavelength selective interference filter.

Item 119. The system of any one of items 112 to 118, wherein the reflective layer comprises a multilayer optical film.

Item 120. The system of any one of items 112 to 119, wherein the optical filter is disposed on a substrate layer.

Item 121. The system of any one of items 112 to 120, wherein the optical filter is configured to at least partially shield the light receiver from visible wavelengths while substantially allowing the light receiver to receive near-infrared wavelengths.

Item 122. The system of any one of items 112 to 121, wherein the optical filter is configured to camouflage one or both of the light receiver or the light emitter from a visual perception.

Item 123. The system of any one of items 112 to 122, wherein the at least one wavelength selective absorbing layer comprises a first wavelength selective absorbing layer and a second wavelength selective absorbing layer, and wherein the wavelength selective reflective layer is between the first wavelength selective absorbing layer and the second wavelength selective absorbing layer.

Item 124. An article comprising an optical filter comprising:
a wavelength selective reflective layer, and
at least one wavelength selective absorbing layer, wherein each respective wavelength selective layer is configured to transmit near-infrared wavelengths, and wherein the optical filter has a visible transmittance at 380-800 nm of less than 0.1% and a near-infrared transmittance at 830-900 nm of greater than 50%.

Item 125. The article of item 124, wherein the optical filter has a visible transmittance at 380-800 nm of less than 0.01% and a near-infrared transmittance at 830-900 nm of greater than 75%.

Item 126. The article of items 124 or 125, wherein the reflective layer comprises a wavelength selective interference filter.

Item 127. The article of any one of items 124 to 126, wherein the reflective layer comprises a multilayer optical film.

Item 128. The article of any one of items 124 to 127, wherein the optical filter is disposed on a substrate layer.

Item 129. The article of any one of items 124 to 128, wherein the at least one wavelength selective absorbing layer comprises a first wavelength selective absorbing layer and a second wavelength selective absorbing layer, and wherein the wavelength selective reflective layer is between the first wavelength selective absorbing layer and the second wavelength selective absorbing layer.

Item 130. The article of any one of items 124 to 130, wherein the optical filter comprises a sealant layer.

Item 131. The article of any one of items 124 to 130, wherein the optical filter comprises a protective coating.

Item 132. The article of any one of items 124 to 131, wherein the wavelength selective absorbing layer comprises one or both of a wavelength selective dye or a wavelength selective pigment.

Item 133. The system of any one of items 69 to 90, wherein the wavelength selective absorbing layer comprises one or both of a wavelength selective dye or a wavelength selective pigment.

Item 134. The article of any one of items 91 to 111, wherein the wavelength selective absorbing layer comprises one or both of a wavelength selective dye or a wavelength selective pigment.

Item 135. The system of any one of items 112 to 123, wherein the wavelength selective absorbing layer comprises one or both of a wavelength selective dye or a wavelength selective pigment.

EXAMPLES

Example 1

Optical properties for various sample optical films were determined. Sample optical films S01 to S34 were prepared as described below. The visible scattering, the near-infrared scattering, total visible reflectance, and diffuse visible reflectance were measured for each of samples S01 to S33, using a spectrometer (Lambda 900, PerkinElmer) with integrating spheres to capture diffuse and specular reflectance. The results are presented in TABLE 1. The presented reflectance values include SPIN (specular included, or total) and SPEX (specular excluded, or diffuse) reflectances. The sensitivity of a proximity sensor covered with the respective sample films was determined, and categorized as one of "Not Working," "Functional," "Good," and "Excellent." The transmittance, haze, and clarity was determined for samples S01 to S34, using a haze meter (Haze-gard Plus, BYK-Gardner). The results are presented in TABLE 2.

Figure 9:
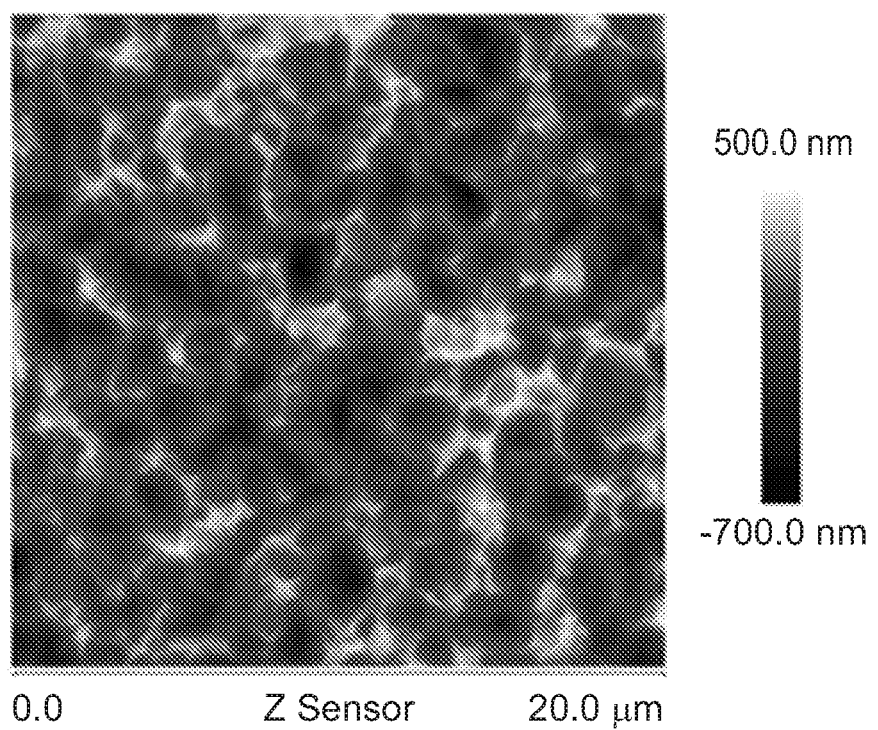
FIG. 9 is an atomic force microscopy (AFM) photograph of a surface of an example optical filter.

Samples S01 to S03 were ULI films, with sample S02 including a high haze high clarity ULI film. Sample S01 was prepared by combining Silquest A-174 75 nm silane particles (Momentive) with pentaerythritol triacrylate monomer (SR444, Sartomer) in a 60% wt ratio, and 2.5% of Irgacure 184 (Ciba Specialty Chemicals Company, High Point N.C), to arrive at a coating thickness of 10 µm. Sample S04 included a film of TiO$_2$ nanoparticles and silicone microparticles. Sample S04 was prepared by mixing 19.13 g of M1192 (Miwon), 3.38 g of CN9018 (Sartomer), 2.5 g of Tospearl 145 (Momentive), 12.5 g of SR415 (Sartomer), 12.5 g of 42.3 wt % TiO$_2$ (UV-TITAN L-530, Sachtleben) in IBOA, 25 g of methylethylketone, and 0.5 g of photoinitiator TPO-L (BASF), and coating the formulation with a #8 Mayer bar. Sample S05 was a film having a microreplicated surface structure (FIG. 9). Sample S6 included 3 µm polystyrene beads coated on ESR2 film (Enhanced Specular Reflector, 3M) for 10 micron dry thickness, with pentaerythritol triacrylate binder (SR444, Sartomer) and isopropyl alcohol solvent. Sample S07 included a non-woven material (a bottom diffuser disassembled from a Sony TV model 40W600B). Sample S08 included a TiO$_2$ coated PET film, SH2FGST Fasara Film (3M). Samples S09 and S10 are bulk diffusers with different haze values. Sample S09 included PATTCLRO frosted acrylate sheet (ePlastics, San Diego, Calif.). Sample S10 included a diffuser plate from a TCL TV (model 40FD2700). Sample S11 was a bottom diffuser sheet from an iPad (first generation, Apple) backlight. Sample S12 included a film of plastic including dispersed TiO$_2$ (plastic 6"×8" pint size seal top food bag with white write-on block, from Elkay Plastics, Bensenville, Ill.). Sample S13 includes white paper (HAmmermill Copy Plus multipurpose printer paper). Sample S14 includes a film having a microreplicated surface structure (iPhone 6 backlight). Samples S15 to S22 include films of ULI material. Sample S23 includes sample S04 folded over itself. Sample S24 includes sample S03 folded over itself. Sample S25 includes sample S15 folded over itself. Sample S26 includes sample S16 folded over itself. Sample S27 includes sample S17 folded over itself. Sample S28 includes sample S18 folded over itself. Sample S29 includes sample S19 folded over itself. Sample S30 includes sample S20 folded over itself. Sample S31 includes sample S21 folded over itself. Sample S32 includes sample S2 folded over itself. Sample S33 includes sample S22 folded over itself

TABLE 1

| | Scattering | | | Visible Reflection | | | Sensitivity of proximity sensor |
| --- | --- | --- | --- | --- | --- | --- | --- |
| | Visible | NIR | | | | | |
| Sample | (400 nm-700 nm) scattering | (800 nm-1200 nm) scattering | Ratio | SPIN (total) | SPEX (diffuse) | Ratio | covered with sample film |
| S01 | 86.01 | 32.19 | 0.37 | 55.51 | 51.60 | 0.93 | Good |
| S02 | 60.62 | 7.96 | 0.13 | 40.47 | 39.85 | 0.98 | Excellent |
| S03 | 24.18 | 4.47 | 0.19 | 24.47 | 21.01 | 0.86 | Excellent |
| S04 | 86.21 | 57.50 | 0.67 | 37.82 | 35.71 | 0.94 | Functional |
| S05 | 8.40 | 5.00 | 0.60 | 7.10 | 6.15 | 0.87 | Excellent |
| S06 | 98.29 | 98.43 | 1.00 | 55.35 | 55.42 | 1.00 | Not Working |
| S07 | 99.05 | 98.74 | 1.00 | 43.43 | 43.95 | 1.01 | Not Working |
| S08 | 97.66 | 90.26 | 0.92 | 51.62 | 52.29 | 1.01 | Not Working |
| S09 | 87.62 | 88.55 | 1.01 | 7.48 | 6.82 | 0.91 | Not Working |
| S10 | 99.50 | 99.18 | 1.00 | 19.77 | 19.36 | 0.98 | Not Working |
| S11 | 91.87 | 87.81 | 0.96 | 14.67 | 14.35 | 0.98 | Not Working |
| S12 | 98.94 | 93.61 | 0.95 | 45.41 | 45.87 | 1.01 | Not Working |
| S13 | 99.46 | 99.61 | 1.00 | 76.89 | 77.67 | 1.01 | Not Working |
| S14 | 89.00 | 88.00 | 0.99 | 8.87 | 8.63 | 0.97 | Not Working |
| S15 | 1.99 | 0.70 | 0.35 | 10.68 | 1.64 | 0.15 | Excellent |
| S16 | 2.39 | 0.49 | 0.21 | 9.69 | 0.66 | 0.07 | Excellent |
| S17 | 2.48 | 0.43 | 0.17 | 9.15 | 0.53 | 0.06 | Excellent |
| S18 | 30.19 | 4.54 | 0.15 | 25.47 | 21.87 | 0.86 | Excellent |
| S19 | 16.42 | 3.18 | 0.19 | 14.01 | 7.25 | 0.52 | Excellent |
| S20 | 1.91 | 1.01 | 0.53 | 10.32 | 0.96 | 0.09 | Excellent |
| S21 | 37.35 | 36.43 | 0.98 | 15.20 | 9.52 | 0.63 | Good |
| S22 | 99.70 | 98.87 | 0.99 | 56.51 | 56.43 | 1.00 | Not Working |
| S23 | 97.58 | 83.67 | 0.86 | 54.77 | 49.05 | 0.90 | Not Working |
| S24 | 53.02 | 11.18 | 0.21 | 39.14 | 28.48 | 0.73 | Excellent |
| S25 | 6.62 | 2.42 | 0.37 | 18.64 | 2.83 | 0.15 | Excellent |
| S26 | 4.45 | 1.90 | 0.43 | 17.61 | 1.38 | 0.08 | Excellent |
| S27 | 4.46 | 1.98 | 0.44 | 17.13 | 1.34 | 0.08 | Excellent |
| S28 | 51.82 | 9.79 | 0.19 | 39.49 | 29.00 | 0.73 | Excellent |
| S29 | 31.93 | 7.35 | 0.23 | 24.97 | 12.60 | 0.50 | Excellent |
| S30 | 5.52 | 2.85 | 0.52 | 18.27 | 1.44 | 0.08 | Excellent |
| S31 | 65.01 | 61.48 | 0.95 | 27.83 | 16.51 | 0.59 | Functional |
| S32 | 81.04 | 17.08 | 0.21 | 56.29 | 50.05 | 0.89 | Good |
| S33 | 99.68 | 99.53 | 1.00 | 71.10 | 66.58 | 0.94 | Not Working |

TABLE 2

| | BYK Haze Gard Values (Visible) | | |
| --- | --- | --- | --- |
| Sample | Transmission | Haze | Clarity |
| S01 | 52.00 | 90.00 | 80.00 |
| S02 | 67.70 | 64.90 | 99.40 |
| S03 | 83.10 | 28.70 | 99.20 |
| S04 | 69.50 | 90.70 | 91.60 |
| S05 | 95.90 | 53.50 | 97.50 |
| S06 | 1.06 | 99.50 | 35.60 |
| S07 | 65.60 | 102.00 | 23.00 |
| S08 | 58.20 | 101.00 | 65.20 |
| S09 | 92.50 | 94.50 | 8.80 |
| S10 | 65.80 | 102.00 | 6.20 |
| S11 | 93.60 | 95.70 | 12.10 |
| S12 | 61.60 | 102.00 | 22.40 |
| S13 | 24.20 | 102.00 | 4.60 |
| S14 | 94.00 | 95.40 | 7.00 |
| S15 | 92.20 | 2.13 | 99.60 |
| S16 | 93.30 | 1.61 | 99.60 |
| S17 | 93.60 | 1.03 | 100.00 |
| S18 | 83.40 | 28.80 | 99.30 |
| S19 | 90.20 | 15.00 | 97.50 |

TABLE 2-continued

| | BYK Haze Gard Values (Visible) | | |
|---|---|---|---|
| Sample | Transmission | Haze | Clarity |
| S20 | 93.40 | 1.89 | 99.60 |
| S21 | 90.30 | 57.10 | 43.90 |
| S22 | 55.30 | 102.00 | 4.70 |
| S23 | 48.40 | 101.00 | 77.60 |
| S24 | 61.50 | 54.80 | 97.80 |
| S25 | 75.70 | 6.60 | 98.70 |
| S26 | 76.40 | 5.14 | 99.00 |
| S27 | 76.80 | 5.17 | 99.00 |
| S28 | 63.20 | 54.50 | 98.20 |
| S29 | 72.20 | 32.10 | 96.30 |
| S30 | 75.70 | 5.35 | 98.60 |
| S31 | 69.90 | 69.40 | 28.90 |
| S32 | 47.60 | 89.70 | 97.70 |
| S33 | 33.80 | 102.00 | 3.90 |
| S34 | 88.70 | 0.24 | 100.00 |

Example 2

Figure 5:
FIG. 5 is a photograph of an example article including an example optical filter and an inked pattern.

FIG. 5 is a photograph of an example article including an example optical filter and an inked pattern. ESR2 is used as a reflective layer. A ULI layer (sample S01 coating) is applied to the reflective layer as the wavelength selective scattering layer. A layer of a latex coating (PrintRite DP 261, Lubrizol) is coated on the ULI layer as combination ink receptor layer and sealant layer, which is 1 mil thick when dry. An ink-jet (solvent ink) printed pattern was printed on top of the ink receptor layer. As shown in FIG. 5, the ink-jet printed pattern is sharp and free of smudges, blurriness, or other defects.

Example 3

Figure 6A:
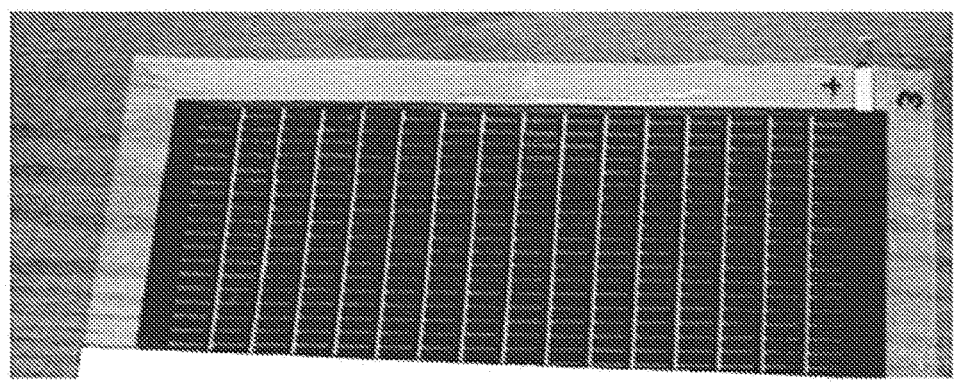
FIG. 6A is a photograph of a solar panel.
Figure 6B:
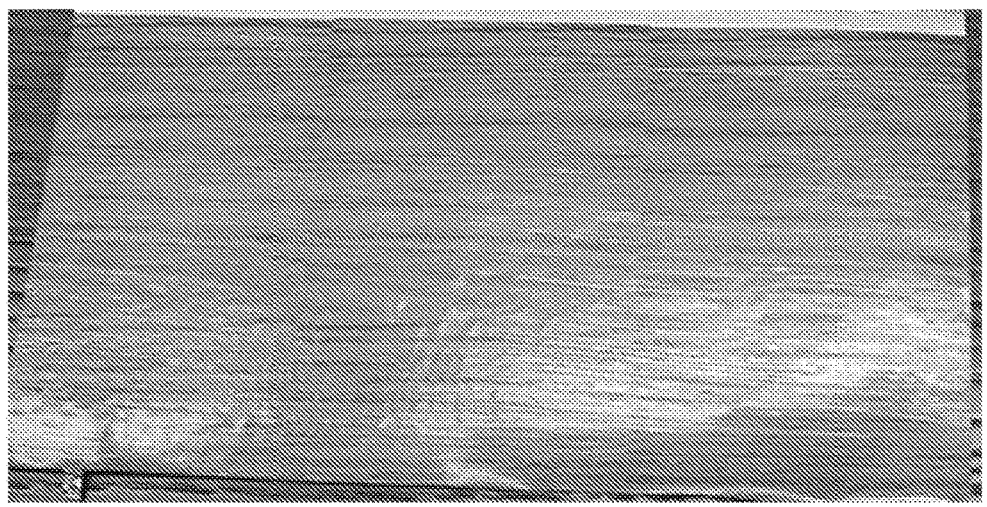
FIG. 6B is a photograph of a solar panel camouflaged by an example optical filter.

FIG. 6A is a photograph of a solar panel. FIG. 6B is a photograph of a solar panel camouflaged by an example optical filter. A multilayer optical filter was formed by depositing a ULI layer (sample S01) on an ESR2 layer. The optical filter was printed with a camouflage pattern (faux wood, similar to the background wood texture). The CIGS (copper indium gallium selenide) film solar panel of FIG. 6A was camouflaged with the example optical filter, as shown in FIG. 6B. The filter was laminated to the solar panel with 3M 8211 Optically Clear adhesive. The camouflaged film panel generated 45% of its original power. The ESR2 film on the back reflected almost all visible light. The power was measured by IV5 solar output test equipment (PV Measurements, Inc., Boulder Colo.).

Example 4

Figure 7:
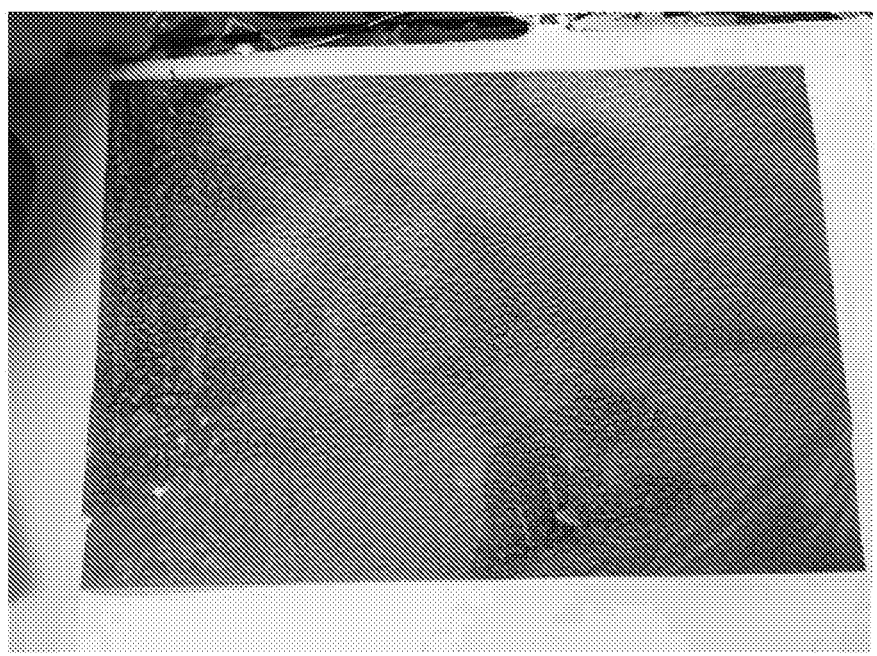
FIG. 7 is a photograph of an example article including an example optical filter and an inked pattern.

FIG. 7 is a photograph of an example article including an example optical filter and an inked pattern. The optical filter was formed of an ULI layer deposited on a reflective substrate. The right hand side of the optical filter was coated with a latex coating (PrintRite DP 261, Lubrizol) that formed a transparent film after drying, as an ink receptive layer region. A pattern was inkjet-printed onto the ink-receptive coated region and the uncoated optical filter region. As shown in FIG. 7, the quality of printing on the uncoated region on the left was poorer than in the region coated with the ink-receptive layer on the right. For example, the printed pattern on the uncoated region was fuzzy and striated.

Example 5

Figure 8A:
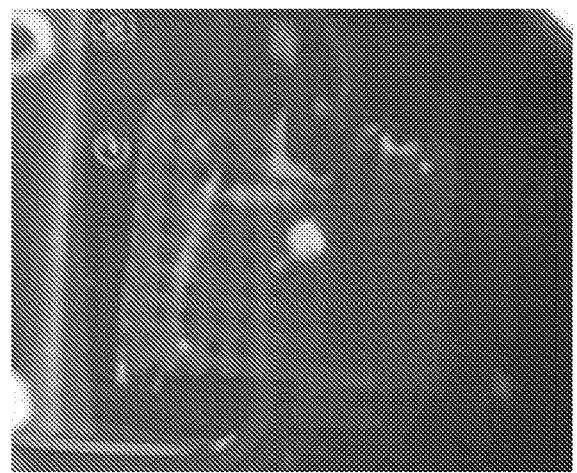
FIGS. 8A-8C are photographs of an example system including an example optical filter and a near-infrared LED.
Figure 8B:
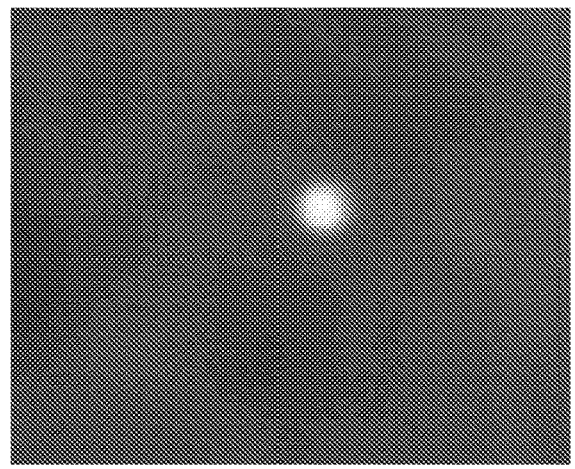
Figure 8C:
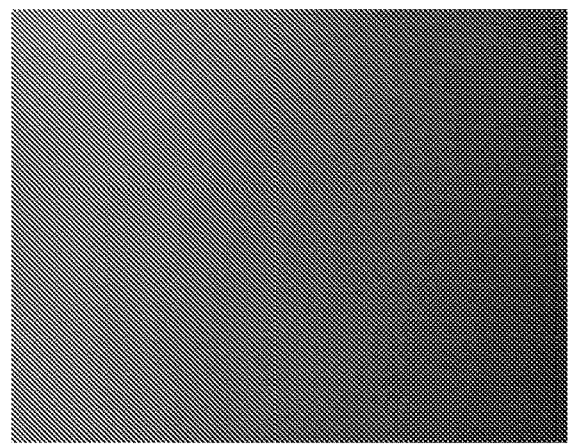

FIG. 8A-8C are photographs of an example system including an example optical filter and a near-infrared LED (similar to the example optical system shown in FIG. 2E). A structure including a near-infrared emitting LED is shown in FIG. 8A. The structure was covered by an example optical filter including a layer of ULI (sample S01) coated on an ESR2 layer. The covered structure was imaged using an infrared camera, resulting in the infrared image shown in FIG. 8B. As shown in FIG. 8B, the image of the LED source is relatively clear, in contrast with the unclear infrared image shown in FIG. 8C. Unlike FIG. 8B, the structure in FIG. 8C (sample S06) was coated with a beaded layer instead of an optical filter including a wavelength selective scattering layer. As shown in FIG. 8C, the unselective beaded layer transmitted the image of the IR LED with very poor clarity.

Example 6

FIG. 9 is an atomic force microscopy (AFM) photograph of a surface of an example optical filter. The optical filter included a surface textured film (sample S05).

Example 7

Figure 10A:
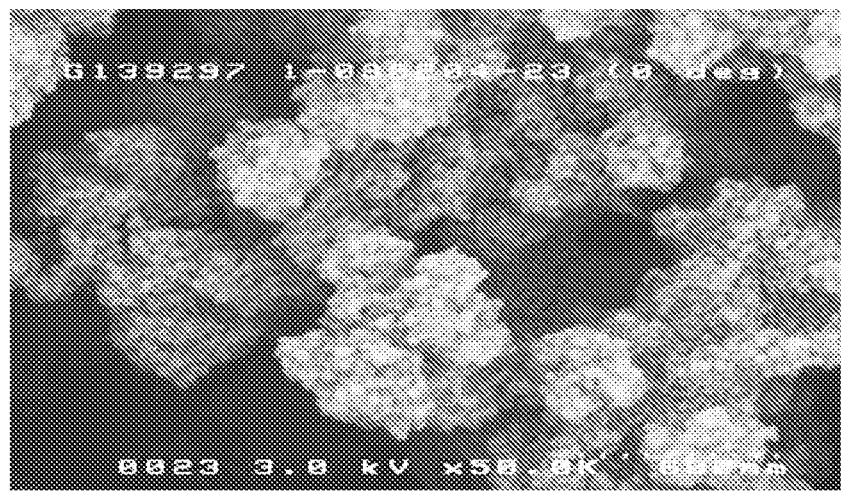
FIGS. 10A and 10B are scanning electron microscopy (SEM) photographs of an example optical filter.
Figure 10B:
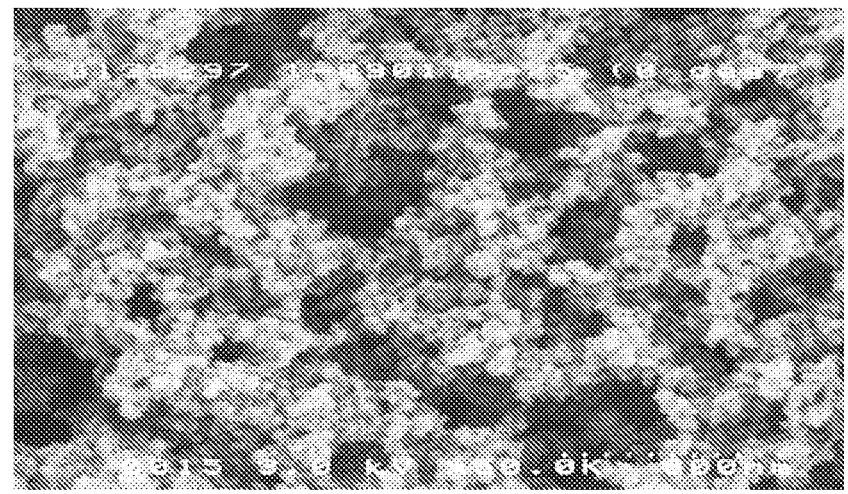

FIGS. 10A and 10B are scanning electron microscopy (SEM) photographs of example optical filters. FIG. 10A shows an optical filter including a high haze low clarity ULI layer (sample S22), while FIG. 10B shows an optical filter including a high haze high clarity ULI layer (sample S02).

Example 8

Figure 11:
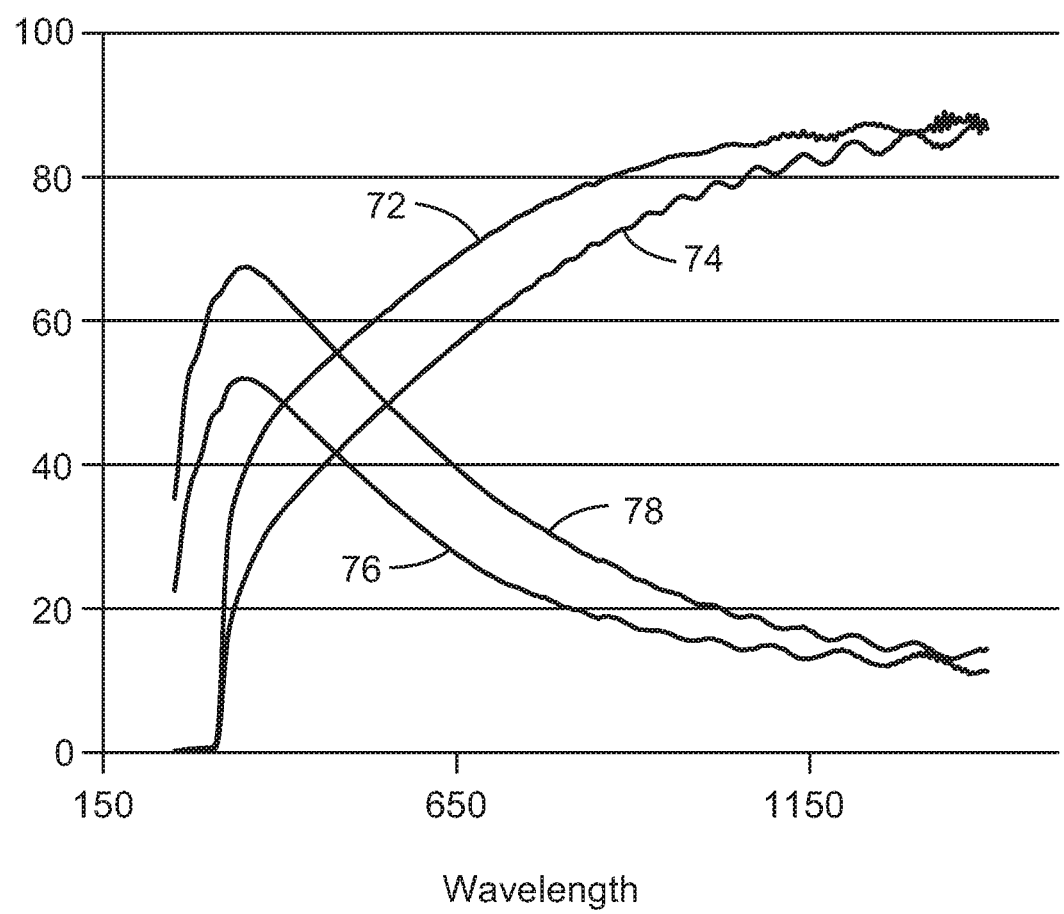
FIG. 11 is a chart presenting % reflectance and % transmittance versus wavelength for example optical filters.

FIG. 11 is a chart presenting % reflectance and % transmittance versus wavelength for example optical filters. Curve 72 represents % transmission of a first sample ULI layer (sample S01). Curve 74 represents % transmittance of a second sample ULI layer (sample S01, but 50% thicker). Curve 76 represents % transmittance of the first sample ULI layer. Curve 78 represents % reflectance of the second sample ULI layer. As shown in FIG. 11, both sample ULI layers selective reflected visible wavelengths, while transmitting near-infrared wavelengths.

Example 9

Figure 12A:
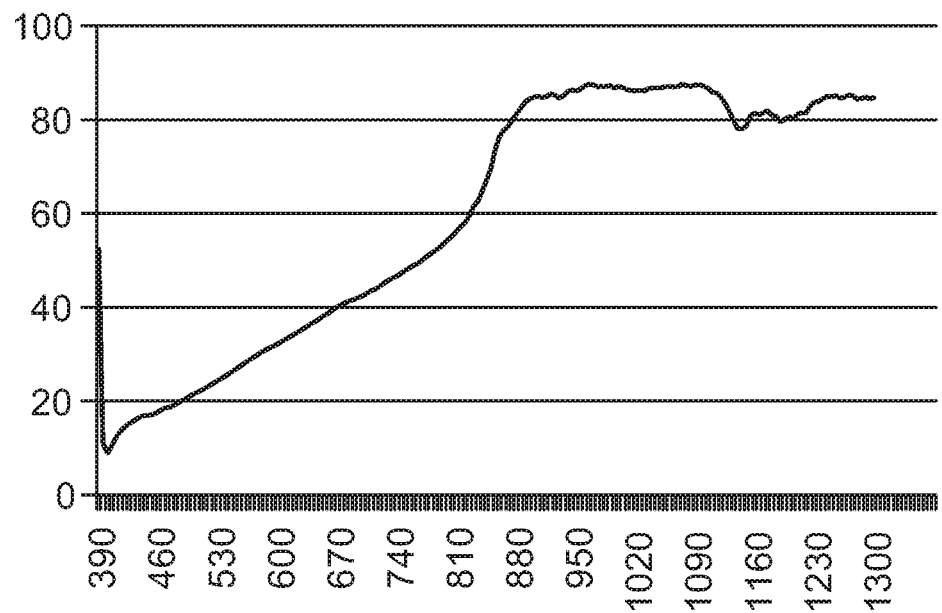
FIGS. 12A and 12B are charts presenting % transmittance versus wavelength for example optical filters.
Figure 12B:
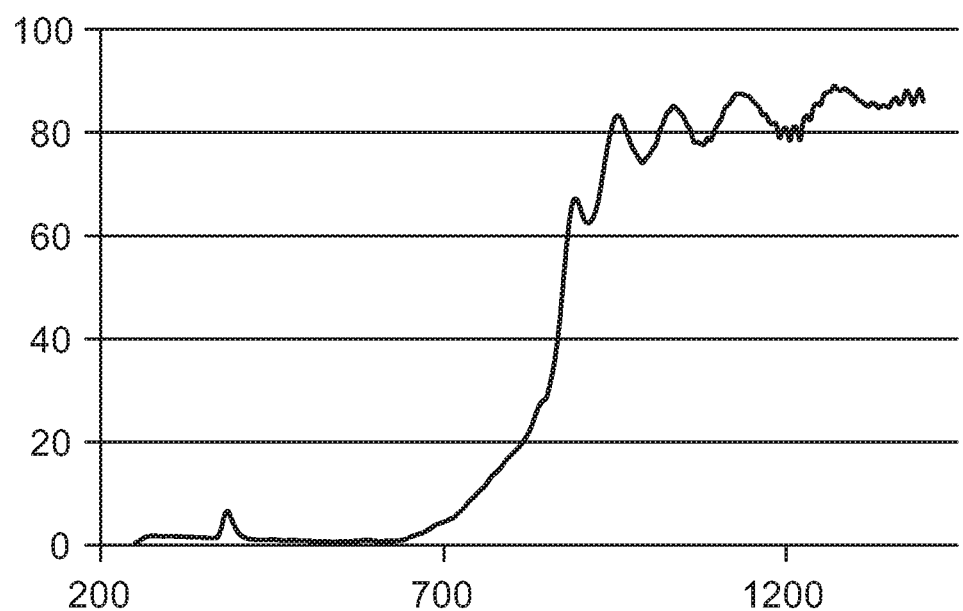

FIGS. 12A and 12B are charts presenting % transmittance versus wavelength for example optical filters. FIG. 12A presents % transmittance for a first sample optical filter including ESR2 coated with beads (sample 506), and limited with PET. FIG. 12B presents transmittance for a second sample optical filter including ESR2 coated with ULI, and laminated with PET. While both sample optical filters transmitted near-infrared wavelengths, as shown in FIGS. 12A and 12B, the ULI-coated ESR selectively blocked the transmission of visible wavelengths compared to the bead-coated ESR, which blocked visible wavelengths to a lower extent.

Example 10

Figure 13:
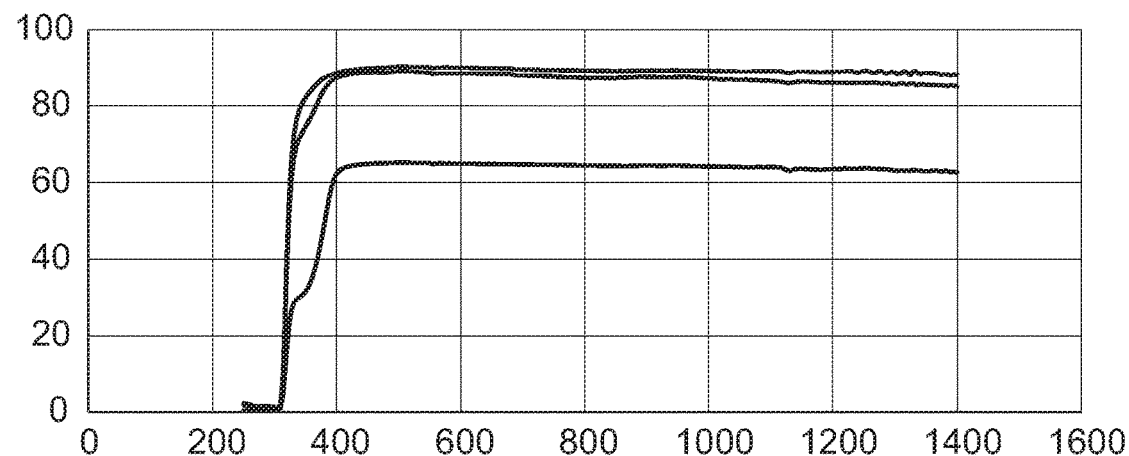
FIG. 13 is a chart presenting % transmittance versus wavelength for example optical filters.

FIG. 13 is a chart presenting % transmittance versus wavelength for sample films. The uppermost curve presents % transmittance for uncoated PET, which can be seen to be relatively flat across the visible and near-infrared regions of the spectrum. The middle curve and the lower curve present % transmittance for a #3 Mayer Bar bead-coated PET layer, and a #10 Mayer Bar bead-coated PET layer respectively. While the bead-coat reduced transmittance, it did not selectively reduce transmittance, and the resulting transmittance curve was also relatively flat across the visible and near-infrared regions of the spectrum. Thus, bead-coated PET did not perform well as wavelength selective scattering layers formed by coating ULI.

Example 11

Figure 14:
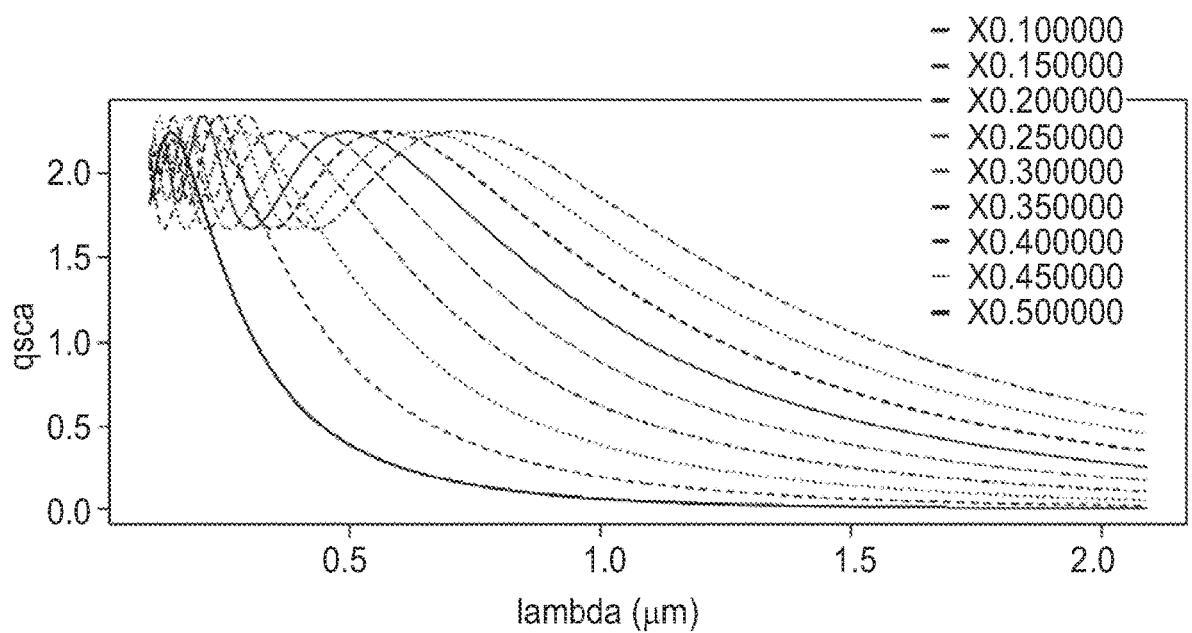
FIG. 14 is a chart presenting results of Mie scattering, showing scattering efficiency versus wavelength for example optical filters.

FIG. 14 is a chart presenting results of Mie scattering, showing scattering efficiency versus wavelength for optical filters including particles of different sizes. For optical filters including particles dispersed in a medium, a model based on Mie scattering was prepared for scattering efficiency as a function of particle size of particles dispersed in the medium and the difference between refractive indices of the medium and the particles. The model was evaluated by setting the refractive index of the medium to 1.5, and that of the scattering particles to 1.0. The particle size was varied from 0.2 µm to 1.0 µm, in steps of 0.1 µm (curves from left to right).

Example 12

Figure 15:
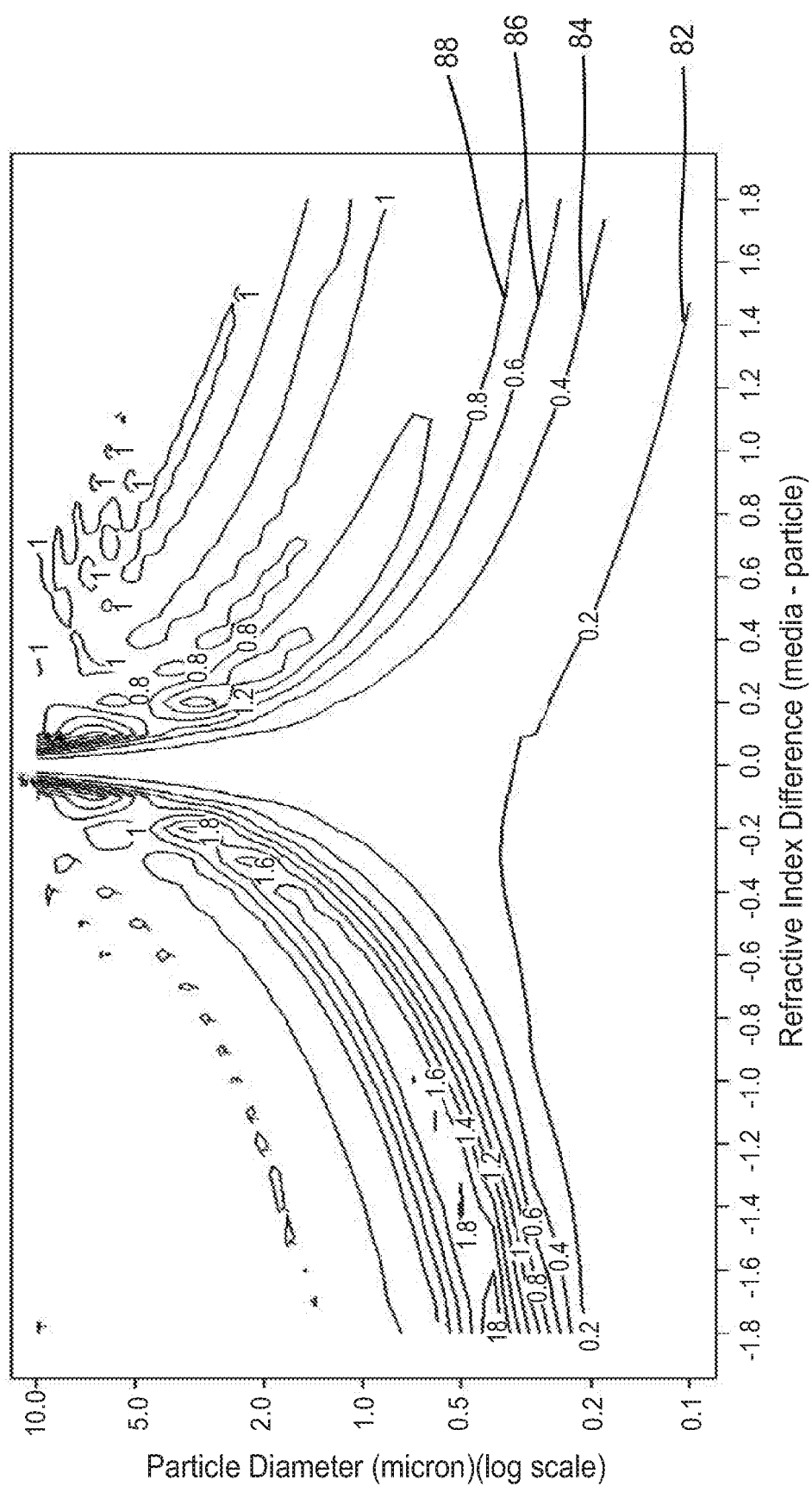
FIG. 15 is a chart presenting near-infrared scattering ratio as a function of particle diameter and refractive index difference for example wavelength selective scattering layers including a medium and a plurality of particles.

FIG. 15 is a chart presenting near-infrared scattering ratio as a function of particle diameter and refractive index difference for optical filters including a medium and a plurality of particles dispersed in the medium. The effect of particle size and the difference between the refractive indices of the medium and the particle on the near-infrared scattering ratio was evaluated using a model, and the results of the model are presented in FIG. 15. The X axis represents difference between refractive indices (media-particle) and the Y axis represents particle diameters (in microns). The contour lines represent different scattering ratios such as 0.2, 0.4, 0.6, 0.8, 1, 1.2, 1.4, 1.6, and 1.8. Thus, curve 82 represents a near-infrared scattering ratio of 0.2. Curve 84 represents a near-infrared scattering ratio of 0.4. Curve 86 represents a near-infrared scattering ratio of 0.6. Curve 88 represents a near-infrared scattering ratio of 0.8.

Example 13

TABLE 3 presents the minimum scattering (transmission) of the diffusive coating that can simulate a hybrid surface (or non-metal) with certain refractive index, on air interface.

TABLE 3

Hybrid or non-metal surface

| RI | R % | Theoretical max SPEX/SPIN | SPIN − SPEX | Diffusive coating T % SPEX/SPIN |
|---|---|---|---|---|
| 1.5 | 4% | 96% | 4% | 80.0% |
| 1.7 | 7% | 93% | 7% | 73.5% |
| 1.8 | 8% | 92% | 8% | 71.7% |
| 2.0 | 10% | 90% | 10% | 68.4% |
| 2.3 | 16% | 84% | 16% | 60.0% |
| 2.4 | 17% | 83% | 17% | 58.8% |
| 2.5 | 18% | 82% | 18% | 57.6% |

The surface is treated as being white. R % is calculated by Fresnel reflection of air to the material with known RI. The theoretical maximum ratio of SPEX/SPIN (diffusive/total visible reflection) was calculated assuming 100% total reflection=Fresnel reflection+diffusive reflection.

Example 14

The diffusive and total reflectance for a number of samples was measured using an X-Rite. The results are presented in TABLE 4.

TABLE 4

| Sample | R % SPIN | R % SPEX | SPEX/ SPIN | SPIN − SPEX |
|---|---|---|---|---|
| I-Phone cover white | 68.7 | 67.19 | 0.98 | 1.51 |
| White china plate #1 | 69.29 | 62.38 | 0.90 | 6.91 |
| White china plate #2 | 87.1 | 83.17 | 0.95 | 3.93 |
| White Board | 81.29 | 76.68 | 0.94 | 4.61 |
| Di-Noc white HG-1205 (3M) | 89.73 | 85.65 | 0.95 | 4.08 |
| Di-Noc black HG-1201 (3M) | 4.97 | 0.42 | 0.08 | 4.55 |
| Di-Noc gray HG-1512 (3M) | 11.42 | 6.82 | 0.60 | 4.6 |
| Di-Noc red HG-1511 (3M) | 12.47 | 8.08 | 0.65 | 4.39 |

Example 15

Figures 16A, 16B:
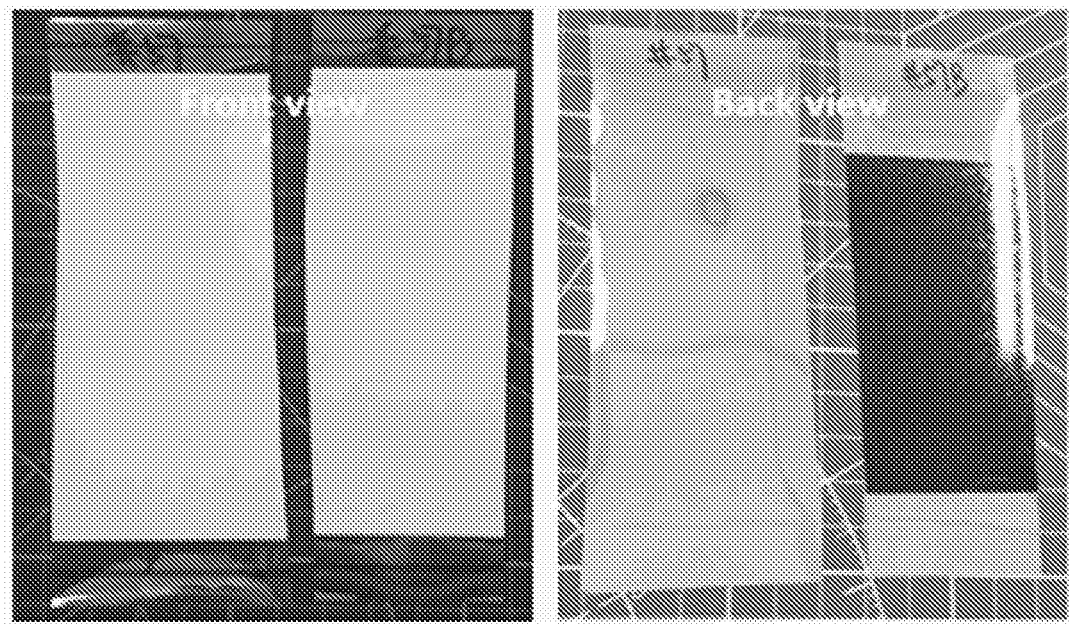
FIGS. 16A-16D are photographs comparing wet-out of a near-infrared film that includes a near-infrared black ink coating and a near-infrared film that does not include a near-infrared black ink coating.
Figures 16C, 16D:
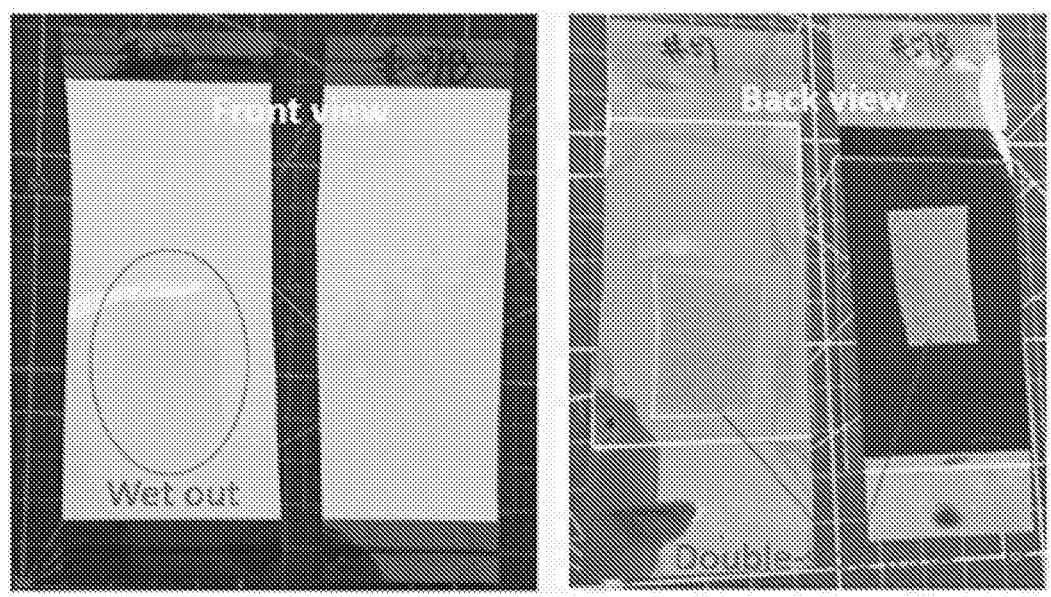
Figure 17:
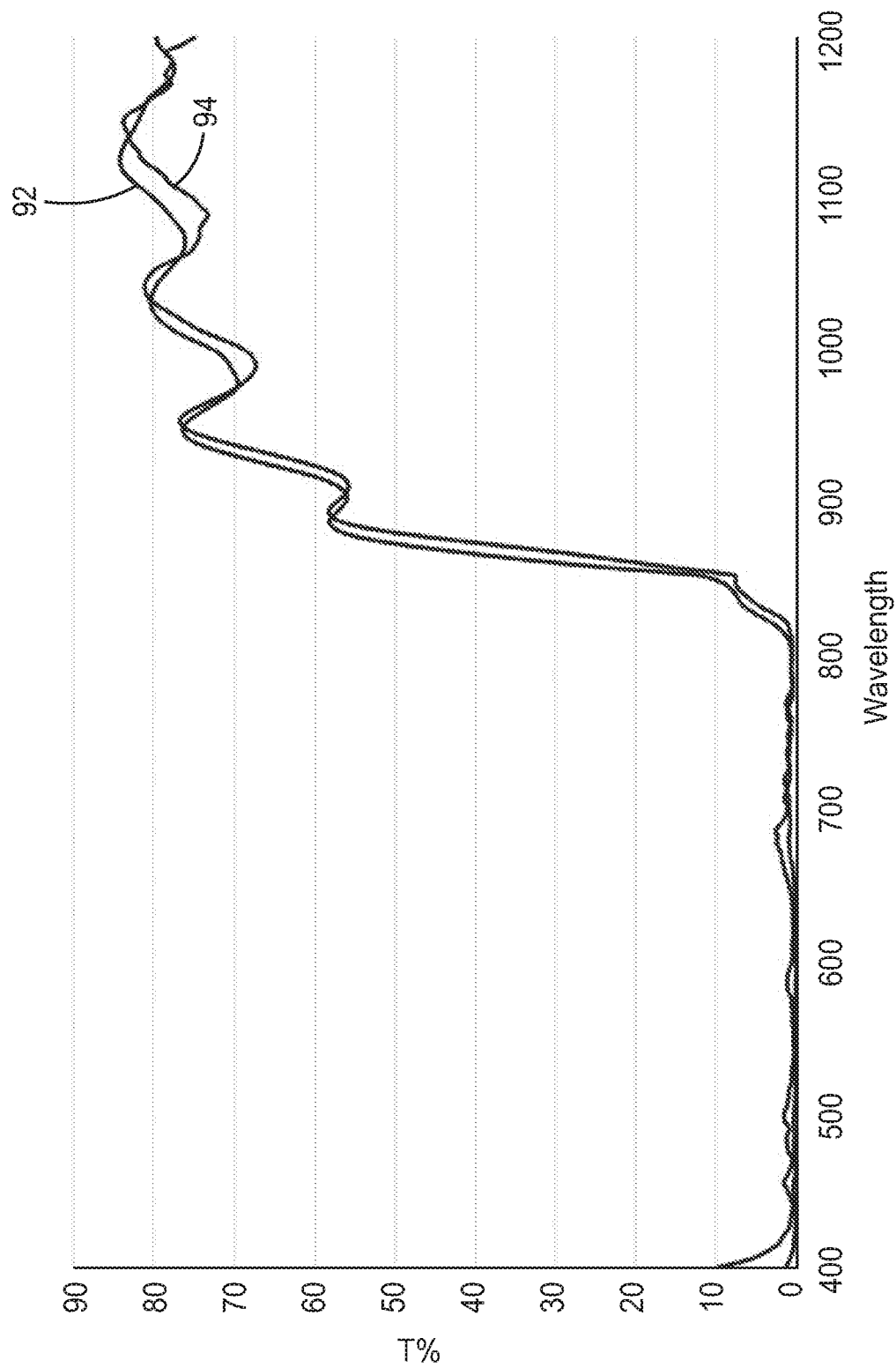
FIG. 17 is a chart presenting % transmittance versus wavelength for the near-infrared films of FIGS. 16A-16D.

Wet-out of near-infrared films was evaluated. A wet-out is a visible disruption or disturbance in the uniform appearance of an optical film applied to a substrate, in particular, at regions where the optical film contacts the substrate. Two near-infrared films were prepared by applying a wavelength selective infrared light transmissive visible light blocking scattering ULI layer on a reflective multilayer optical ESR2 film. A near-infrared transmissive black ink was applied to one of the films. FIGS. 16A-16D are photographs comparing wet out of the near-infrared films. FIG. 16A shows the front and FIG. 16B shows the back of the respective near-infrared films, one without the near-infrared ink coating and one with the near-infrared ink coating. A double-sided tape was applied to the back of both films, and the films were respectively adhered to respective glass slides. FIG. 16C shows the front and FIG. 16D shows the back of the respective near-infrared films, one without the near-infrared ink coating and one with the near-infrared ink coating, each adhered to glass slides with a double-sided tape. As seen by comparing FIGS. 16A and 16C, the near-infrared film without the near-infrared ink coating exhibited visible wet-out, while the near-infrared film with the near-infrared ink coating appeared uniform and did not exhibit wet-out. FIG. 17 is a chart presenting % transmittance versus wavelength for the near-infrared films of FIGS. 16A-16D. As shown in FIG. 17, curve 92 represents the transmission spectrum for the near-infrared film without the near-infrared black ink coating, while curve 94 represents the transmission spectrum for the near-infrared film with the near-infrared black ink coating. Thus, applying the near-infrared black ink coating did not significantly impact the visible light blocking and infrared transmittance of the near-infrared film, since each respective film continued to block transmission of wavelengths below about 800 nm, while transmitting wavelengths above about 800 nm. Thus, wet-out was eliminated without affecting the near-infrared filtering properties of the near-infrared film.

Example 16

Figure 18A:
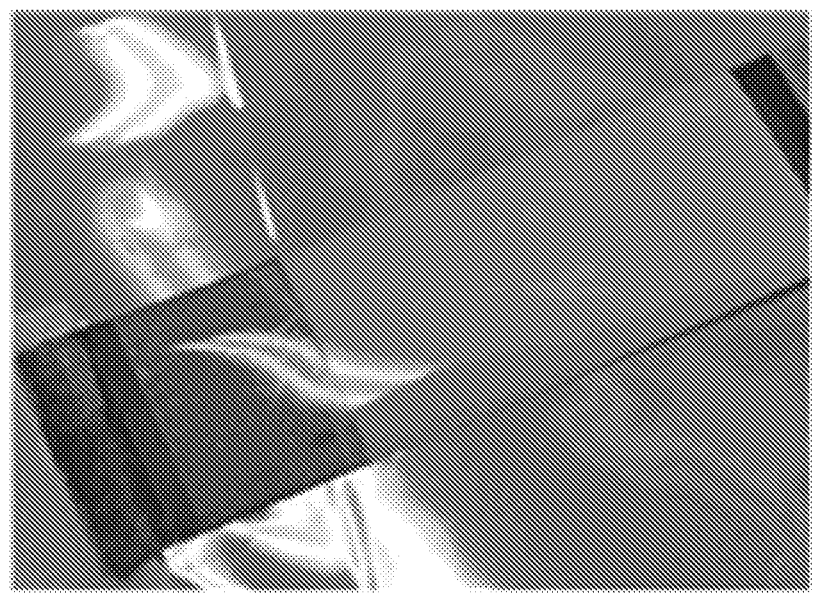
FIGS. 18A-18B are photographs of example near-infrared films including a colored absorbing layer.
Figure 18B:
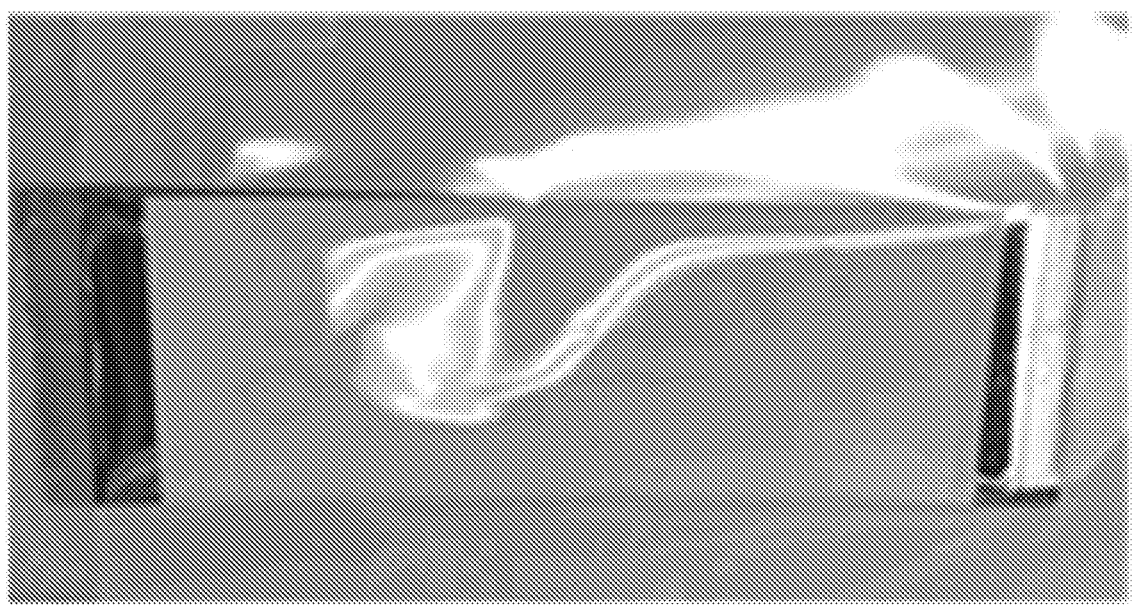

A colored dye was applied to near-infrared films. FIGS. 18A-18B are photographs of example near-infrared films including a colored dye layer. Near-infrared films were prepared by applying a wavelength selective infrared light transmissive visible light blocking scattering ULI layer on a reflective multilayer optical ESR2 film. In the example of FIG. 18A, a cyan dye was applied on top of the scattering layer, at the surface away from the reflective film. The dye coating exhibited visible non-uniformity, as seen in FIG. 18A. In the example of FIG. 18B, the cyan dye was applied between the scattering layer and the reflective film. The cyan dye layer imparted a visibly uniform cyan tinge to the near-infrared film, as seen in FIG. 18B.

Example 17

Figure 19:
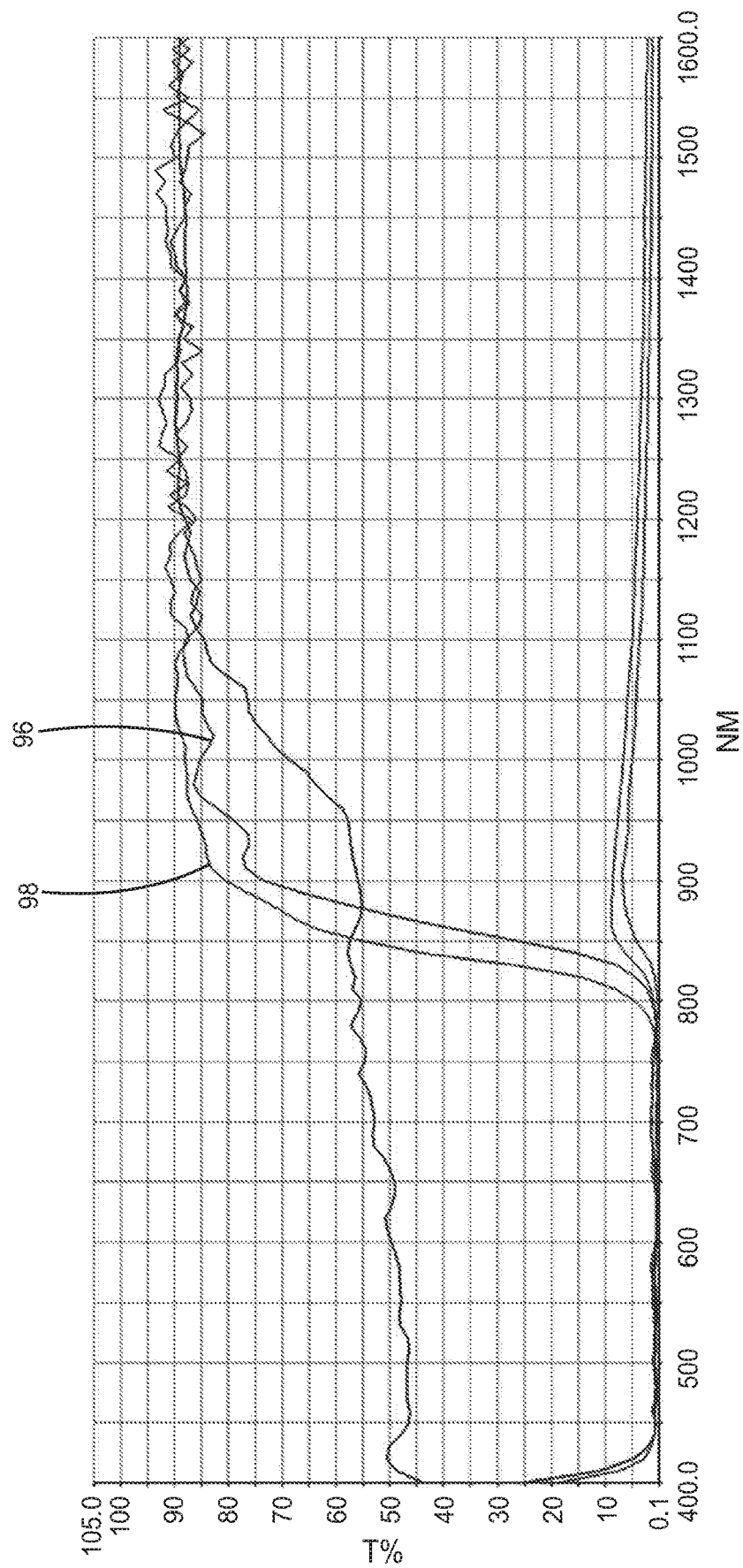
FIG. 19 is a chart presenting % transmittance versus wavelength for a reflective multilayer optical film coated with a near-infrared antireflective coating compared to a reflective multilayer optical film without a near-infrared antireflective coating.

The effect of applying a near-infrared anti-reflective coating on a near-infrared film was evaluated. The transmittance of a reflective multilayer optical film coated with a near-infrared antireflective coating was compared to a reflective multilayer optical film without an infrared antireflective coating. FIG. 19 is a chart presenting % transmittance versus wavelength for the reflective multilayer optical film coated with a near-infrared antireflective coating (curve 98) compared to the reflective multilayer optical film without a near-infrared antireflective coating (curve 96). As seen in curve 96, the reflective multilayer optical film presented high order harmonics outside of the main reflective band. The harmonic ripples were stronger closer to the main reflective band. As seen in curve 98, applying the near-infrared antireflective coating increased the transmission and smoothed out the harmonic ripples.

Example 18

Figure 20B:
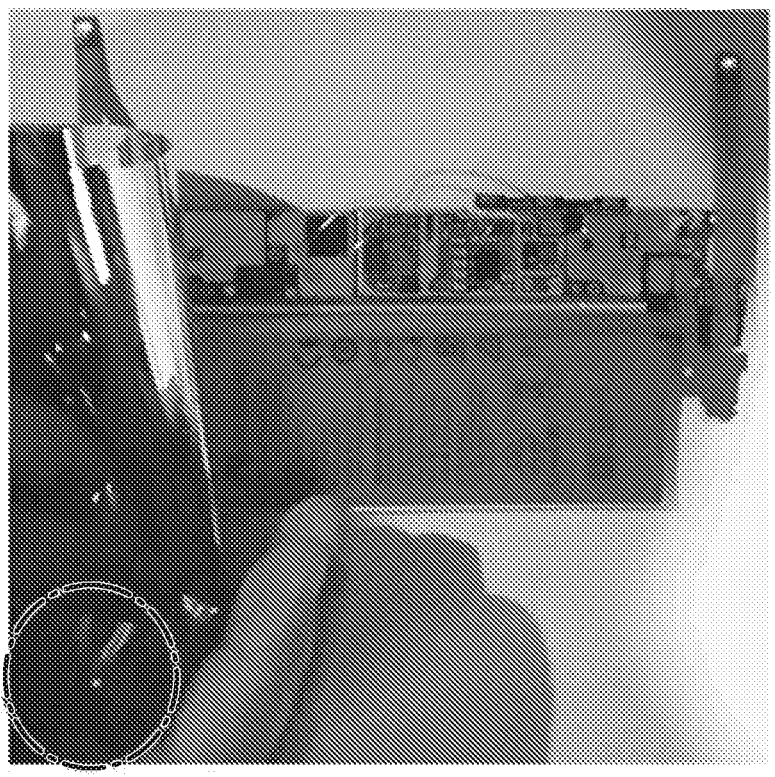
FIG. 20B is a photograph of an example system including an infrared LED with a visible light component filtered by a reflective multilayer optical film without an absorbing layer.
Figure 20A:
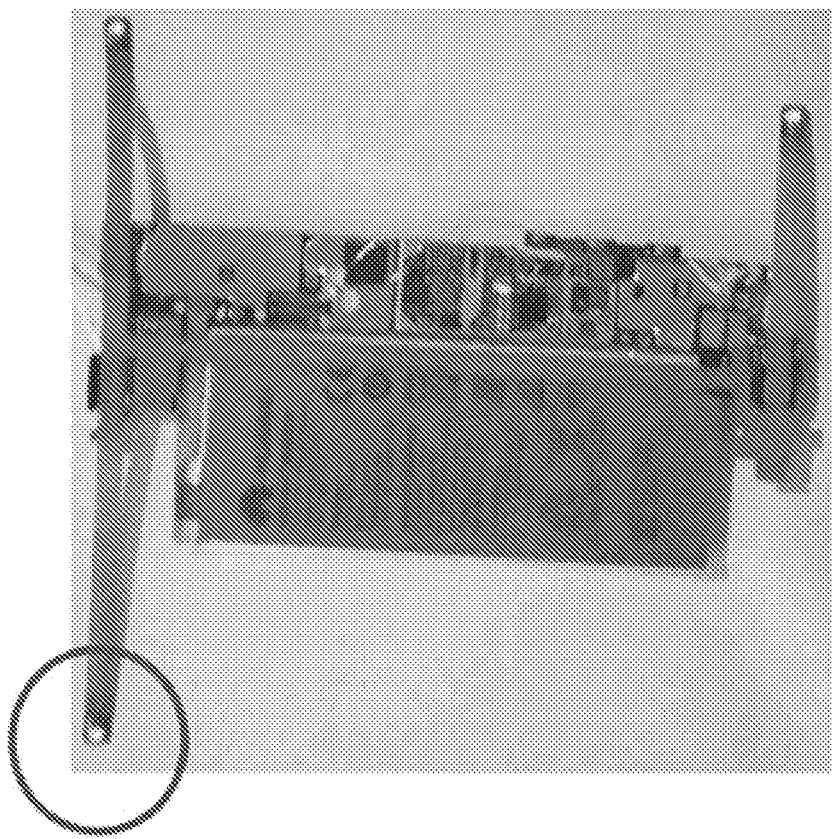
FIG. 20A is a photograph of an example system including an infrared LED with a visible light component.
Figure 21:
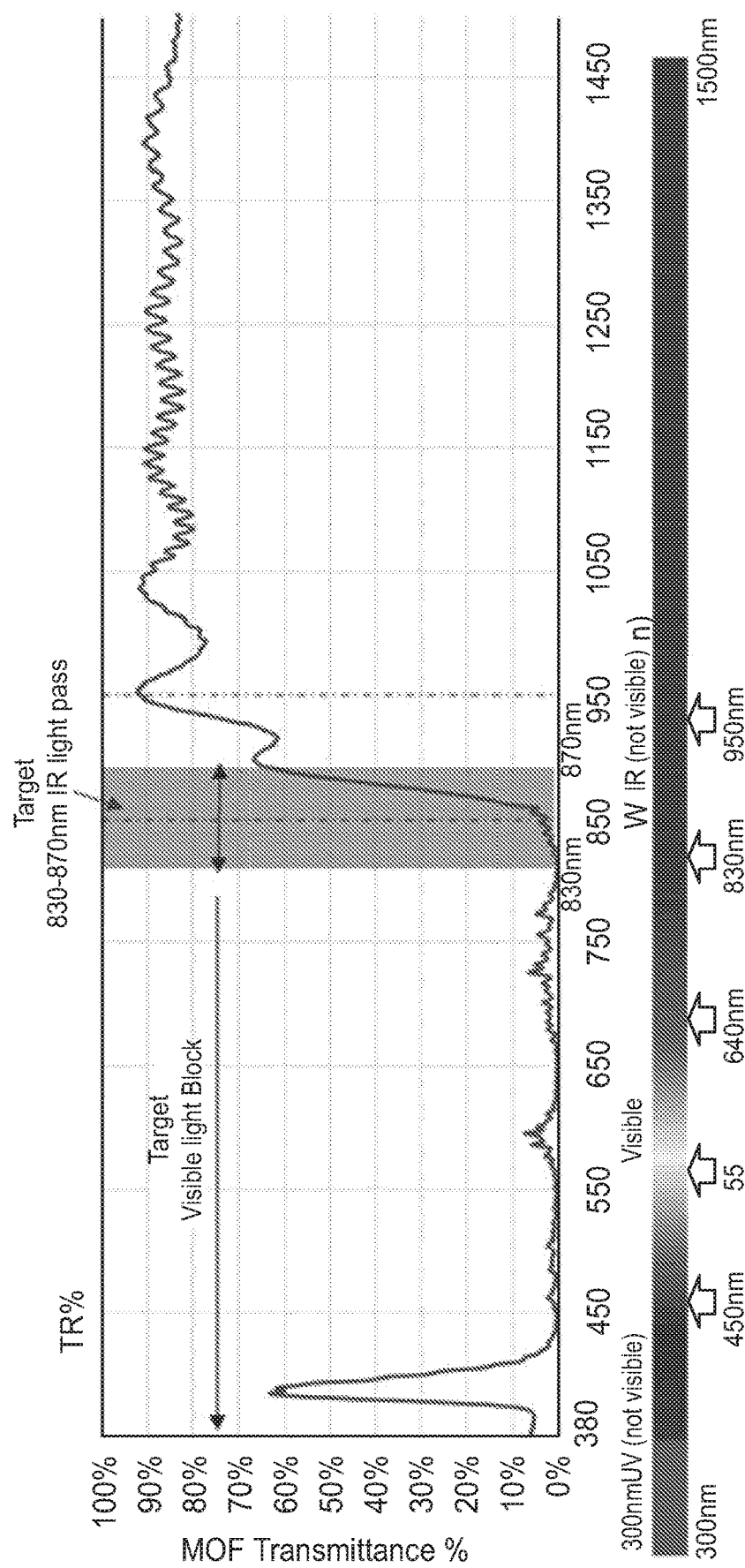
FIG. 21 is a chart presenting % transmittance versus wavelength for a reflective multilayer optical film without an infrared dye coating.
Figure 22:
FIG. 22 is a chart presenting % transmittance versus wavelength for a reflective multilayer optical film with an infrared dye coating compared to comparative optical filters without dye coatings.

The effect of a near-infrared dye coating on blocking of visible red component emitted by an infrared source by a reflective multilayer optical film was evaluated. FIG. 20A is a photograph of an example system including an infrared LED with a visible red light component. FIG. 20B is a photograph of an example system including an infrared LED with a visible light component filtered by a reflective multilayer optical film (ESR2) that did not include a dye coating. As seen in FIG. 20B, while the ESR2 film reduced the intensity of the visible component emitted by the infrared LED to some extent, did not completely block the transmission of the visible component. FIG. 21 is a chart presenting % transmittance versus wavelength for the reflective multilayer optical film (ESR2) without a dye coating. As seen in FIG. 21, while ESR2 transmits wavelengths above about 830 nm (including near-infrared wavelengths) and blocks wavelengths below 830 nm (including visible wavelengths), ESR2 is unable to block all visible wavelengths. For example, the transmission spectrum exhibited peaks between 380 and 450 nm, and between 550 and 650 nm. FIG. 22 is a chart presenting % transmittance versus wavelength for a reflective multilayer optical film with an infrared dye coating compared to comparative optical filters without dye coatings. Curves 102 and 106 represent transmittance of different optical filters that do not include a dye coating. As seen in FIG. 22, the optical filters of curves 102 and 106, while blocking visible wavelengths to some extent, they did not completely block visible components of the spectrum. In contrast, curve 104, which completely blocks visible wavelengths while substantially transmitting near-infrared wavelengths, represents an ESR2 film including a near-infrared dye coating, MingBo ink IR 9508-A and MingBo ink IR9508-B (available from Mingbo Anti-Forgery Technology (Shenzhen) Co., Ltd., Guangdong, China). Wavelengths between 380-800 nm are absorbed by MingBo IR ink but wavelengths between 830-900 nm are transmitted. The MingBo IR ink was coated on both sides of ESR2 in the example of curve 104. The transmission between 380-800 nm was near 0%, while transmission between 830-900 nm was higher than 75%. The film of curve 104 was used to conceal an infrared source in an iris scanning apparatus. Thus, applying a near-infrared dye coating improved the blocking of visible components by ESR2, while allowing the transmittance of near-infrared wavelengths.

Various examples of the invention have been described. These and other examples are within the scope of the following claims.

The invention claimed is:

1. A system comprising:
one or both of a light emitter or a light receiver; and
an optical filter adjacent one or both of the light emitter or the light receiver and configured to provide high clarity near-infrared transmission such that a near-infrared pattern can be sensed through the optical filter, wherein the optical filter comprises a wavelength selective scattering layer, wherein the wavelength selective scattering layer has a near-infrared scattering ratio of less than about 0.9, the near-infrared scattering ratio being a ratio of an average near-infrared scattering to an average visible scattering, and wherein the wavelength selective scattering layer has a visible reflective haze ratio of greater than about 0.5, the visible reflective haze ratio being a ratio of an average visible diffusive reflectance to an average visible total reflectance.

2. The system of claim 1, wherein the wavelength selective scattering layer has a near-infrared scattering ratio of less than about 0.7.

3. The system of claim 1, wherein the wavelength selective scattering layer has a near-infrared scattering ratio of less than about 0.6.

4. The system of claim 1, wherein the wavelength selective scattering layer has a visible reflective haze ratio of greater than about 0.6.

5. The system of claim 1, wherein the wavelength selective scattering layer has a visible reflective haze ratio of greater than about 0.7.

6. The system of claim 1, wherein one or both of the light emitter or the light receiver have an operating wavelength within a near-infrared range.

7. The system of claim 1, wherein the wavelength selective scattering layer transmits less than about 50% of incident visible light, and wherein the wavelength selective scattering layer transmits greater than about 50% of incident near-infrared light.

8. The system of claim 1, wherein the wavelength selective scattering layer scatters greater than about 50% of incident visible light.

9. The system of claim 1, wherein the wavelength selective scattering layer scatters greater than about 50% of incident visible light as white light.

10. The system of claim 1, wherein the wavelength selective scattering layer comprises an optical medium have a first refractive index, wherein the optical medium comprises a plurality of particles, wherein the plurality of particles has a second refractive index and an average particle size of less than about 5 μm, and wherein an absolute difference between the first refractive index and the second refractive index is less than about 0.1.

11. The system of claim 1, wherein the wavelength selective scattering layer comprises an optical medium have a first refractive index, wherein the optical medium comprises a plurality of particles, wherein the plurality of particles has a second refractive index and an average particle size of less than about 1 μm, and wherein an absolute difference between the first refractive index and the second refractive index is less than about 0.2.

12. The system of claim 1, wherein the wavelength selective scattering layer comprises an optical medium have a first refractive index, wherein the optical medium comprises a plurality of particles, wherein the plurality of particles has a second refractive index and an average particle size of less than about 0.5 μm, and wherein an absolute difference between the first refractive index and the second refractive index is less than about 0.4.

13. The system of claim 1, wherein the wavelength selective scattering layer comprises an optical medium have a first refractive index, wherein the optical medium comprises a plurality of particles, wherein the plurality of particles has a second refractive index and an average particle size of less than about 0.3 μm, and wherein an absolute difference between the first refractive index and the second refractive index is less than about 0.6.

14. The system of claim 1, wherein the wavelength selective scattering layer comprises an optical medium have a first refractive index, wherein the optical medium comprises a plurality of particles, wherein the plurality of particles has a second refractive index and an average particle size of less than about 0.2 μm, and wherein an absolute difference between the first refractive index and the second refractive index is less than about 1.8.

15. The system of claim 1, wherein the wavelength selective scattering layer comprises an optical medium have a first refractive index, wherein the optical medium comprises a plurality of particles, wherein the plurality of particles has a second refractive index, wherein an average particle size of the plurality of particles, the first refractive index, and the second refractive index are selected from a region under a line representing a near-infrared scattering ratio of 0.2 in a contour plot of near-infrared scattering ratio for wavelength selective scattering layers comprising media and particles, a vertical axis of the contour plot being particle diameter, a horizontal axis of the contour plot being a refractive index difference between the media and particles, wherein the refractive index difference is between −1.8 to 1.8.

16. The system of claim 1, wherein the wavelength selective scattering layer comprises an optical medium have a first refractive index, wherein the optical medium comprises a plurality of particles, wherein the plurality of particles has a second refractive index, wherein an average particle size of the plurality of particles, the first refractive index, and the second refractive index are selected from a region under a line representing a near-infrared scattering ratio of 0.4 in a contour plot of near-infrared scattering ratio for wavelength selective scattering layers comprising media and particles, a vertical axis of the contour plot being particle diameter, a horizontal axis of the contour plot being a refractive index difference between the media and particles, wherein the refractive index difference is between −1.8 to 1.8.

17. The system of claim 1, wherein the wavelength selective scattering layer comprises an optical medium have a first refractive index, wherein the optical medium comprises a plurality of particles, wherein the plurality of particles has a second refractive index, wherein an average particle size of the plurality of particles, the first refractive index, and the second refractive index are selected from a region under a line representing a near-infrared scattering ratio of 0.6 in a contour plot of near-infrared scattering ratio for wavelength selective scattering layers comprising media and particles, a vertical axis of the contour plot being particle diameter, a horizontal axis of the contour plot being a refractive index difference between the media and particles, wherein the refractive index difference is between −1.8 to 1.8.

18. The system of claim 1, wherein the wavelength selective scattering layer comprises an optical medium have a first refractive index, wherein the optical medium comprises a plurality of particles, wherein the plurality of particles has a second refractive index, wherein an average particle size of the plurality of particles, the first refractive index, and the second refractive index are selected from a region under a line representing a near-infrared scattering ratio of 0.8 in a contour plot of near-infrared scattering ratio for wavelength selective scattering layers comprising media and particles, a vertical axis of the contour plot being particle diameter, a horizontal axis of the contour plot being a refractive index difference between the media and particles, wherein the refractive index difference is between −1.8 to 1.8.

19. The system of claim 1, wherein the wavelength selective scattering layer has a visible haze of at least 25%.

20. The system of claim 1, wherein the optical filter comprises surface optical microstructures.

21. The system of claim 1, wherein the light emitter comprises a near-infrared LED or a near-infrared laser.

22. The system of claim 1, wherein the light receiver comprises a near-infrared camera or a light sensor having a near-infrared receiving band.

23. The system of claim 1, wherein the wavelength selective scattering layer comprises a binder, a plurality of particles, and a plurality of interconnected voids, wherein a volume fraction of the plurality of interconnected voids in the wavelength selective scattering layer is not less than about 20%, and wherein a weight ratio of the binder to the plurality of the particles is not less than about 1:2.

24. The system of claim 1, wherein the optical filter comprises a reflective layer.

25. The system of claim 1, wherein the optical filter comprises a beaded diffuser layer.

26. The system of claim 1, wherein the optical filter is configured to at least partially shield the light receiver from visible wavelengths while substantially allowing the light receiver to receive near-infrared wavelengths.

27. The system of claim 1, wherein the optical filter is configured to camouflage one or both of the light receiver or the light emitter from a visual perception.

28. The system of claim 1, wherein the optical filter further comprises:
a wavelength selective reflective layer, and
at least one wavelength selective absorbing layer, wherein each respective wavelength selective layer is configured to transmit near-infrared wavelengths.

29. The system of claim 1, wherein the optical filter has a visible transmittance at 380-800 nm of less than 0.1% and a near-infrared transmittance at 830-900 nm of greater than 50%.

30. A method comprising:
disposing an optical filter adjacent one or both of a light emitter or a light receiver, the optical filter configured to provide high clarity near-infrared transmission such that a near-infrared pattern can be sensed through the optical filter, wherein the optical filter comprises a wavelength selective scattering layer, wherein the wavelength selective scattering layer has a near-infrared scattering ratio of less than about 0.9, the near-infrared scattering ratio being a ratio of an average near-infrared scattering to an average visible scattering, and wherein the wavelength selective scattering layer has a visible reflective haze ratio of greater than about 0.5, the visible reflective haze ratio being a ratio of an average visible diffusive reflectance to an average visible total reflectance.

31. An article comprising an optical filter, the optical filter configured to provide high clarity near-infrared transmission such that a near-infrared pattern can be sensed through the optical filter, wherein the optical filter comprises a wavelength selective scattering layer, wherein the wavelength selective scattering layer has a near-infrared scattering ratio of less than about 0.9, the near-infrared scattering ratio being a ratio of an average near-infrared scattering to an average visible scattering, and wherein the wavelength selective scattering layer has a visible reflective haze ratio of greater than about 0.5, the visible reflective haze ratio being a ratio of an average visible diffusive reflectance to an average visible total reflectance.

32. An article comprising an optical filter, the optical filter configured to provide high clarity near-infrared transmission such that a near-infrared pattern can be sensed through the optical filter, wherein the optical filter comprises a wavelength selective scattering layer, wherein the wavelength selective scattering layer has an average near-infrared scattering of less than 60%, wherein the wavelength selective scattering layer has an average visible scattering of greater than 10%, wherein a difference between the % total visible reflectance and the % diffuse visible reflectance is less than 20, wherein the wavelength selective scattering layer has a near-infrared scattering ratio of less than about 0.9, the near-infrared scattering ratio being a ratio of an average near-infrared scattering to an average visible scattering, and wherein the wavelength selective scattering layer has a visible reflective haze ratio of greater than about 0.5, the visible reflective haze ratio being a ratio of an average visible diffusive reflectance to an average visible total reflectance.

33. An article comprising an optical filter, the optical filter configured to provide high clarity near-infrared transmission such that a near-infrared pattern can be sensed through the optical filter, wherein the optical filter comprises:
  a wavelength selective scattering layer, wherein the wavelength selective scattering layer is configured to substantially scatter visible wavelengths, wherein the wavelength selective scattering layer has a near-infrared scattering ratio of less than about 0.9, the near-infrared scattering ratio being a ratio of an average near-infrared scattering to an average visible scattering, and wherein the wavelength selective scattering layer has a visible reflective haze ratio of greater than about 0.5, the visible reflective haze ratio being a ratio of an average visible diffusive reflectance to an average visible total reflectance,
  a wavelength selective reflective layer, and
  at least one wavelength selective absorbing layer, wherein each respective wavelength selective layer is configured to transmit near-infrared wavelengths.

* * * * *